United States Patent
Horiuchi

(10) Patent No.: US 11,693,395 B2
(45) Date of Patent: Jul. 4, 2023

(54) PRODUCTION MANAGEMENT SYSTEM, PRODUCTION MANAGEMENT PROGRAM, PRODUCTION QUANTITY MANAGEMENT SYSTEM, AND PRODUCTION QUANTITY MANAGEMENT PROGRAM

(71) Applicant: MIMAKI ENGINEERING CO., LTD., Nagano (JP)

(72) Inventor: Yuhei Horiuchi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 143 days.

(21) Appl. No.: 17/414,953

(22) PCT Filed: Nov. 21, 2019

(86) PCT No.: PCT/JP2019/045556
§ 371 (c)(1),
(2) Date: Jun. 17, 2021

(87) PCT Pub. No.: WO2020/129530
PCT Pub. Date: Jun. 25, 2020

(65) Prior Publication Data
US 2022/0057783 A1 Feb. 24, 2022

(30) Foreign Application Priority Data

Dec. 18, 2018 (JP) .............................. JP2018-236045
Dec. 18, 2018 (JP) .............................. JP2018-236046

(51) Int. Cl.
G05B 19/418 (2006.01)

(52) U.S. Cl.
CPC ... G05B 19/4188 (2013.01); G05B 19/41805 (2013.01); G05B 19/41875 (2013.01)

(58) Field of Classification Search
CPC .......... G05B 19/4188; G05B 19/41805; G05B 19/41875; G05B 2219/45186;
(Continued)

(56) References Cited

U.S. PATENT DOCUMENTS

| 4,819,176 | A | * | 4/1989 | Ahmed | ................... | G06Q 10/06 |
| | | | | | | 700/109 |
| 2011/0299116 | A1 | * | 12/2011 | Hibino | ............... | H04N 1/00233 |
| | | | | | | 358/1.15 |
| 2019/0020787 | A1 | * | 1/2019 | Xu | ......................... | B41J 2/2128 |

FOREIGN PATENT DOCUMENTS

| EP | 2474656 | 7/2012 |
| JP | 2003067167 | 3/2003 |

(Continued)

OTHER PUBLICATIONS

"Office Action of Japan Counterpart Application", dated Feb. 16, 2022, with English translation thereof, p. 1-p. 6.
(Continued)

Primary Examiner — Thomas C Lee
Assistant Examiner — Tyler Dean Hedrick
(74) Attorney, Agent, or Firm — JCIPRNET

(57) ABSTRACT

[Object] To appropriately produce a product generated by printing on a medium.
[Solving Means] A production management system that manages production of a product generated by executing printing on a medium determines (S104, S114) a recommended condition of processing by an electronic device scheduled to be used for generation of a product, based on processing condition information indicating, for each step of generating the product, a relationship among quality of the product, a type and an installing place of the electronic device that performs at least one step of generating the product, and a recommended condition of processing by the electronic device, the target quality of the product, and the
(Continued)

type and the installing place of the electronic device scheduled to be used for generating the product.

14 Claims, 15 Drawing Sheets

(58) Field of Classification Search
CPC ........... G05B 2219/45196; G05B 2219/45222; D06B 21/00; B41J 3/4078; G06F 3/1208; G06F 3/1254; G06F 3/1288; G06Q 10/06; G06Q 50/04; Y02P 90/30
See application file for complete search history.

(56) References Cited

FOREIGN PATENT DOCUMENTS

| | | |
|---|---|---|
| JP | 2003112409 | 4/2003 |
| JP | 2006215690 | 8/2006 |
| JP | 2006228017 | 8/2006 |
| JP | 2015147848 | 8/2015 |
| JP | 2016030385 | 3/2016 |
| WO | 2017082367 | 5/2017 |

OTHER PUBLICATIONS

"Notification of Reason for Rejection of Japan Counterpart Application", dated Sep. 14, 2022, with English translation thereof, p. 1-p. 9.

"International Search Report (Form PCT/ISA/210) of PCT/JP2019/045556," dated Feb. 4, 2020, with English translation thereof, pp. 1-8.

Office Action of Japan Counterpart Application, with English translation thereof, dated Jan. 11, 2023, pp. 1-7.

Office Action of Japan Counterpart Application, with English translation thereof, dated Jan. 11, 2023, pp. 1-5.

* cited by examiner

FIG. 4

24f Pre-processing machine processing condition information

| Information of medium | Type of pre-processing agent | Quality of product | Type of pre-processing machine | Installing information of pre-processing machine | Recommended condition of processing by pre-processing machine |
|---|---|---|---|---|---|
| ... | ... | ... | Dev001 | USA | ... |

FIG. 5

24j Production history information

| Date and time of production | Target quality of product | Information of medium | Type of pre-processing machine | Installing information of pre-processing machine | Type of pre-processing agent | Condition of processing by pre-processing machine | Type of printer | Installing place of printer |
|---|---|---|---|---|---|---|---|---|
| October 31, 2018 10:00:00 | . . . | . . . | . . . | . . . | . . . | . . . | . . . | . . . |

| Type of ink | Condition of processing by printer | Type of steaming machine | Installing place of steaming machine | Condition of processing by steaming machine | Type of washing machine | Installing place of washing machine | Condition of processing by washing machine | Target quality? |
|---|---|---|---|---|---|---|---|---|
| . . . | . . . | . . . | . . . | . . . | . . . | . . . | . . . | YES |

FIG. 6

24I Pre-processing machine yield rate prediction value information

| Identification information of pre-processing machine | Identification information of operator | Type of medium | Type of pre-processing agent | Condition of processing | Prediction value of yield rate |
|---|---|---|---|---|---|
| DEV001 | USER001 | | | | 9 5 % |
| | | | . . . | . . . | . . . |
| | . . . | . . . | . . . | . . . | . . . |
| . . . | . . . | . . . | . . . | . . . | . . . |
| . . . | . . . | . . . | . . . | . . . | . . . |

FIG. 7

24p Pre-processing machine yield rate history information

| Date and time of processing | Identification information of pre-processing machine | Identification information of operator | Type of medium | Type of pre-processing agent | Condition of processing | Yield rate |
|---|---|---|---|---|---|---|
| . . . | . . . | . . . | . . . | . . . | . . . | . . . |
| October 31, 2018 10:00:00 | DEV001 | USER001 | | | | 93% |
| . . . | . . . | . . . | . . . | . . . | . . . | . . . |

FIG. 8

24t Medium management information

| Identification information of medium | Length of medium | State of medium |
|---|---|---|
| MED001 | 200m | Unprocessed state |
| ... | ... | ... |

PRODUCTION MANAGEMENT SYSTEM, PRODUCTION MANAGEMENT PROGRAM, PRODUCTION QUANTITY MANAGEMENT SYSTEM, AND PRODUCTION QUANTITY MANAGEMENT PROGRAM

CROSS-REFERENCE TO RELATED APPLICATION

This application is a 371 application of the international PCT application serial no. PCT/JP2019/045556, filed on Nov. 21, 2019, which claims the priority benefits of Japan application no. 2018-236045, filed on Dec. 18, 2018, and Japan application no. 2018-236046, filed on Dec. 18, 2018. The entirety of each of the above-mentioned patent applications is hereby incorporated by reference herein and made a part of this specification.

TECHNICAL FIELD

The present invention relates to a production management system, a production management program, a production quantity management system, and a production quantity management program that manage production of a product obtained by executing printing on a medium such as a textile.

BACKGROUND ART

Patent Literature 1 discloses a method of executing printing on a long textile to produce a product. The method includes a step of performing pre-processing of printing on a textile, a step of performing printing on a textile, and a step of performing post-processing of printing on a textile.

CITATION LIST

Patent Literature

Patent Literature 1: Japanese Unexamined Patent Publication No. 2015-147848

SUMMARY OF INVENTION

Technical Problems

Patent Literature 1 does not consider the influence of an installing place of a device that performs each of the above-described steps. If the installing place is different, conditions such as temperature and humidity in the environment in which each step is performed are different, and thus the difference in the conditions of the environment affects the quality of the product.

Therefore, the quality of the product varies depending on the installing place of the device that performs each of the above-described steps, and as a result, the production of the product is hindered.

Furthermore, in producing a product through the method of Patent Literature 1, there is a case of relying on the experience of an operator as to how long a textile needs to be prepared. Therefore, the length of the produced product may be too short or too long with respect to the length of the target product. If the length of the prepared product is short, the yield of production of the product lowers. If the length of the prepared product is long, the processing time becomes long in the step of performing the pre-processing described above and the like, and thus the productivity of the product lowers.

Therefore, the production of a product is hindered.

Therefore, it is required to appropriately produce a product.

Solutions to Problems

A first invention of the present application relates to a production management system that manages production of a product generated by executing a printing process on a medium, wherein
a step of generating the product includes:
a printing step, and
at least one of a pre-processing step of the printing process and a post-processing step of the printing process;
wherein the production management system includes:
a processing condition information management portion that manages a processing condition information indicating a recommended condition of processing by an electronic device that performs at least one step of generating the product; and
a recommended condition determination portion that determines a recommended condition of processing by the electronic device scheduled to be used for generation of the product;
wherein the processing condition information is information indicating, for every step of generating the product, a relationship among:
a quality of the product,
a type and an installing place of the electronic device, and
a recommended condition of processing by the electronic device;
wherein the recommended condition determination portion determines a recommended condition of processing by the electronic device scheduled to be used for generation of the product based on:
a target quality of the product,
a type and an installing place of the electronic device scheduled to be used for generation of the product, and
the processing condition information managed by the processing condition information management portion.

According to such a configuration, the production management system of the present invention determines a recommended condition of processing by an electronic device scheduled to be used for generation of a product, based on processing condition information indicating a relationship among quality of the product, a type and an installing place of the electronic device to be used for generating the product, and a recommended condition of processing by the electronic device, the target quality of the product, and the type and the installing place of the electronic device scheduled to be used for generating the product, so that variation in the quality of the product due to the installing place of the electronic device used for generating the product can be reduced.

The production management system of the present invention may further include: a used device determination portion that automatically determines the electronic device scheduled to be used for generating the product based on a specific algorithm.

According to such a configuration, since the production management system of the present invention automatically determines the electronic device scheduled to be used for generating the product based on a specific algorithm, convenience can be improved.

In the production management system of the present invention, the processing condition information management portion may learn the processing condition information based on an actual condition of processing by the electronic device and an actual quality of the product processed by the electronic device under the actual condition.

According to such a configuration, since the production management system of the present invention learns the processing condition information based on the actual condition of processing by the electronic device and the actual quality of the product processed by the electronic device under such condition, the accuracy of the processing condition information can be improved, and as a result, the variation in the quality of the product due to the installing place of the electronic device used to generate the product can be further reduced.

A second invention of the present application relates to a non-transitory computer readable medium stored with a production management program that manages production of a product generated by executing a printing process on a medium, wherein
 a step of generating the product includes:
  a printing step, and
  at least one of a pre-processing step of the printing process and a post-processing step of the printing process;
 wherein the production management program causes a computer to realize:
  a processing condition information management portion that manages a processing condition information indicating a recommended condition of processing by an electronic device that performs at least one step of generating the product; and
  a recommended condition determination portion that determines a recommended condition of processing by the electronic device scheduled to be used for generation of the product;
 wherein the processing condition information is information indicating, for every step of generating the product, a relationship among:
  a quality of the product,
  a type and an installing place of the electronic device, and
  a recommended condition of processing by the electronic device;
 wherein the recommended condition determination portion determines a recommended condition of processing by the electronic device scheduled to be used for generation of the product based on:
  a target quality of the product,
  a type and an installing place of the electronic device scheduled to be used for generation of the product, and
  the processing condition information managed by the processing condition information management portion.

According to such a configuration, since the computer that executes the production management program of the present invention determines a recommended condition of processing by an electronic device scheduled to be used for generation of a product, based on processing condition information indicating a relationship among quality of the product, a type and an installing place of the electronic device used for generating the product, and a recommended condition of processing by the electronic device, the target quality of the product, and the type and the installing place of the electronic device scheduled to be used for generating the product, variation in the quality of the product due to the installing place of the electronic device used for generating the product can be reduced.

A third invention of the present application relates to a production quantity management system that acquires an amount of a medium required for production of a product generated by executing a printing process on a medium, wherein
 a step of generating the product includes:
  a printing step; and
  at least one of a pre-processing step of the printing process and a post-processing step of the printing process,
 wherein the production quantity management system includes:
  a yield rate management portion that manages a prediction value of a yield rate of the medium in each step of generating the product; and
  a required amount acquisition portion that acquires an amount of the medium required for each step of generating the product;
 wherein the required amount acquisition portion acquires a required amount of the medium based on a required amount of the product and the prediction value managed by the yield rate management portion.

According to such a configuration, since the production quantity management system of the present invention acquires the required amount of media on the basis of the required amount of products and the prediction value of the yield rate of the medium in each step of generating the product, a more appropriate amount of products than the conventional art can be produced.

In the production quantity management system of the present invention, the required amount acquisition portion may acquire an amount of substance used in the step based on the amount of the medium required for at least one of the steps of generating the product.

According to such a configuration, since the production quantity management system of the present invention acquires the amount of substance used in the step based on the amount of media required for at least one of the steps of generating the product, a more appropriate amount of products can be produced.

In the production quantity management system of the present invention, the yield rate management portion may generate the prediction value in the step based on an actual yield rate in at least one of the steps of generating the product.

According to such a configuration, since the production quantity management system of the present invention generates the prediction value of the yield rate in the step based on the actual yield rate in at least one of the steps of generating a product, the accuracy of the prediction value of the yield rate can be improved.

In the production quantity management system of the present invention, the yield rate management portion may manage the prediction value in this step in association with a value of at least one item of identification information of an electronic device that executes at least one step among the steps of generating the product, identification information of an operator of the electronic device, the type of medium processed by the electronic device, the type of substance to be used by the electronic device, and a condition of processing by the electronic device, and the required amount acquisition portion may acquire the required amount of the medium on the basis of the required amount of the product and the prediction value managed by the yield rate management portion in association with an actual value of the item.

According to such a configuration, since the production quantity management system of the present invention acquires the required amount of media based on a prediction value of the yield rate manned in association with an actual value of at least one item of identification information of an electronic device that executes at least one of the steps of generating a product; identification information of an operator of the electronic device, the type of medium to be processed by the electronic device, the type of substance to be used by the electronic device, and the condition of processing by the electronic device, a more appropriate amount of products can be produced.

The production quantity management system of the present invention may further include: a medium management portion that manages an amount of the medium for each medium.

According to such a configuration, since the production quantity management system of the present invention manages the amount of media for each medium, a product can be generated using a medium of a required amount, and as a result, a more appropriate amount of products can be produced.

A fourth invention of the present application relates to a non-transitory computer readable medium stored with a production quantity management program that manages production quantity of a product generated by executing a printing process on a medium, wherein
 a step of generating the product includes:
  a printing step; and
  at least one of a pre-processing step of the printing process and a post-processing step of the printing process;
 wherein the production quantity management program causes a computer to realize:
  a yield rate management portion that manages a prediction value of a yield rate of the medium in each step of generating the product; and
  a required amount acquisition portion that acquires an amount of the medium required for each step of generating the product;
 wherein the required amount acquisition portion acquires a required amount of the medium based on a required amount of the product and the prediction value managed by the yield rate management portion.

According to such a configuration, since the computer that executes the production quantity management program of the present invention acquires the required amount of media on the basis of the required amount of products and the prediction value of the yield rate of the medium in each step of generating the product, a more appropriate amount of products than the conventional art can be produced.

Effect of the Invention

According to the production management system and the production management program of the present invention, the variation in the quality of the product due to the installing place of the electronic device that performs at least one step of generating the product.

According to the production quantity management system and the production quantity management program of the present invention, a product can be produced in a more appropriate amount than the conventional art.

As a result, the product can be appropriately produced.

BRIEF DESCRIPTION OF THE DRAWINGS

FIG. 4 is a diagram illustrating an example of pre-processing machine processing condition information illustrated in FIG. 2.

FIG. 5 is a diagram illustrating an example of production history information illustrated in FIG. 2.

FIG. 6 is a diagram illustrating an example of pre-processing machine yield rate prediction value information illustrated in FIG. 2.

FIG. 7 is a diagram illustrating an example of pre-processing machine yield rate history information illustrated in FIG. 2.

FIG. 8 is a diagram illustrating an example of medium management information illustrated in FIG. 2.

DESCRIPTION OF EMBODIMENTS

Hereinafter, an embodiment of the present invention will be described with reference to the drawings.

Figure 1:
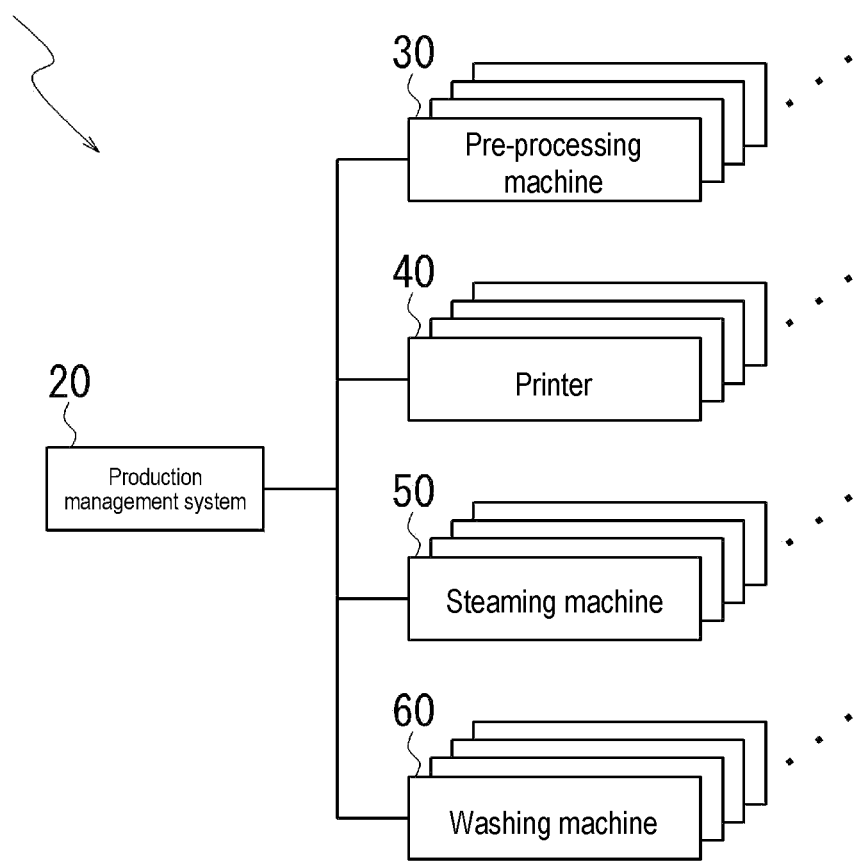
FIG. 1 is a block diagram of a production system according to one embodiment of the present invention.

FIG. 1 is a block diagram of a production system 10 according to the present embodiment.

First, a configuration of the production system 10 according to the present embodiment will be described.

The production system 10 illustrated in FIG. 1 is a system that produces a product.

Here, the product means that generated by executing a printing process on a medium such as a textile.

As illustrated in FIG. 1, the production system 10 includes a production management system 20, a pre-processing machine 30, a printer 40, a steaming machine 50, and a washing machine 60.

The production management system 20 manages the production of a product in the production system 10.

The pre-processing machine 30 is an electronic device that performs a pre-processing of the printing process on a medium. Specifically, the pre-processing machine 30 performs a process of applying a pre-processing agent for preventing smearing of ink to a medium.

The printer 40 is an electronic device that performs printing on a medium. The printer 40 performs a printing step on a medium applied with the pre-processing agent using ink.

The steaming machine 50 (steamer) is an electronic device that performs a steaming process (steaming process) on the printed medium. The steaming process of the medium is performed to cause the ink adhered to the medium by printing to develop color and to fix the ink to the medium.

The washing machine 60 (washer) is an electronic device that performs a post-processing on a printed medium. Specifically, the washing machine 60 is performed to wash the medium after the steaming process and to remove excessive pre-processing agent and ink from the medium.

The product is produced through a pre-processing step of applying a pre-processing agent to a medium, a printing step of performing printing on the medium, a steaming process step of performing steaming process on the medium after printing, and a washing step of washing the medium after the steaming process step.

The production management system 20 includes one computer, but may include a plurality of computers.

In addition to the pre-processing machine 30 described above, the production system 10 may include at least one other pre-processing machine that applies a pre-processing agent to a medium.

When the production system 10 includes a plurality of pre-processing machines 30, each of the pre-processing machines 30 may be dispersedly arranged within the installing place of the production system 10.

The processing liquid used by the pre-processing machine is a pre-processing agent.

The following conditions are exemplified as conditions for the processes by the pre-processing machine.

(a) The conveyance speed of the region where the pre-processing is performed in the medium, (b) the tension acting on the region where the pre-processing is performed in the medium, and (c) the temperature in the vicinity of the region where the pre-processing is performed in the medium.

Here, in the conveyor path of the medium in the pre-processing machine, the length of the region where the pre-processing is performed in the medium is constant. Thus, the conveyance speed in the region where the pre-processing is performed in the medium is proportional to the pre-processing time (the execution time of pre-processing) in the region where the pre-processing is performed in the medium.

In addition to the printer 40 described above, the production system 10 may include at least one other printer that performs printing on the medium.

When the production system 10 includes a plurality of printers, each of the printers may be dispersedly arranged within the installing place of the production system 10.

The printer included in the production system 10 may be, for example, an inkjet printer.

The processing liquid used by the printer is ink.

The following conditions are exemplified as conditions for the processes by the printer.

(a) The conveyance speed of the region where printing is performed in the medium, and (b) the drying time of the region where printing is performed in the medium.

Here, in the conveyor path of the medium in the printer, the length of the region where printing is performed in the medium is constant. Thus, the conveyance speed in the region where printing is performed in the medium is proportional to the printing time (the execution time of printing) in the region where printing is performed in the medium.

In addition to the steaming machine 50, the production system 10 may include at least one other steaming machine that performs a steaming process on the medium.

When the production system 10 includes a plurality of steaming machines, each of the steaming machines may be dispersedly arranged within the installing place of the production system 10.

The processing liquid used by the steaming machine is water.

The following conditions are exemplified as conditions for the processes by the steaming machine.

(a) The conveyance speed of the region where the steaming process is performed in the medium, (b) the temperature in the vicinity of the region where the steaming process is performed in the medium, and (c) the humidity in the vicinity of the region where the steaming process is performed in the medium.

Here, in the conveyor path of the medium in the steaming machine, the length of the region where the steaming process is performed in the medium is constant. Thus, the conveyance speed in the region where the steaming process is performed in the medium is proportional to the execution time of the steaming process in the region where the steaming process is performed in the medium.

In addition to the washing machine 60, the production system 10 may include at least one other washing machine that performs a washing process on the medium.

When the production system 10 includes a plurality of washing machines, each of the washing machines may be dispersedly arranged within the installing place of the production system 10.

The processing liquid used by the washing machine is water.

The following conditions are exemplified as conditions for the processes by the washing machine.

(a) The conveyance speed of the region where the washing process is performed in the medium, (b) the tension acting on the region where the washing process is performed in the medium, (c) the temperature in the vicinity of the region where the washing process is performed in the medium, and (d) the timing of replacing water in the washing machine.

Here, in the conveyor path of the medium in the washing machine, the length of the region where the washing process is performed in the medium is constant. Thus, the conveyance speed in the region where the washing process is performed in the medium is proportional to the washing process time (the execution time of washing process) in the region where the washing process is performed in the medium.

The water is replaced in the washing machine at the timing the length of the washed medium reaches a predetermined length, and at this time, a predetermined amount of water is replaced.

In the production system 10, the pre-processing machine 30, the printer 40, the steaming machine 50, the washing machine 60, and the production management system 20 included in the production system 10 are communicably connected to each other via a network such as a local area network (LAN) or the Internet.

Figure 2:
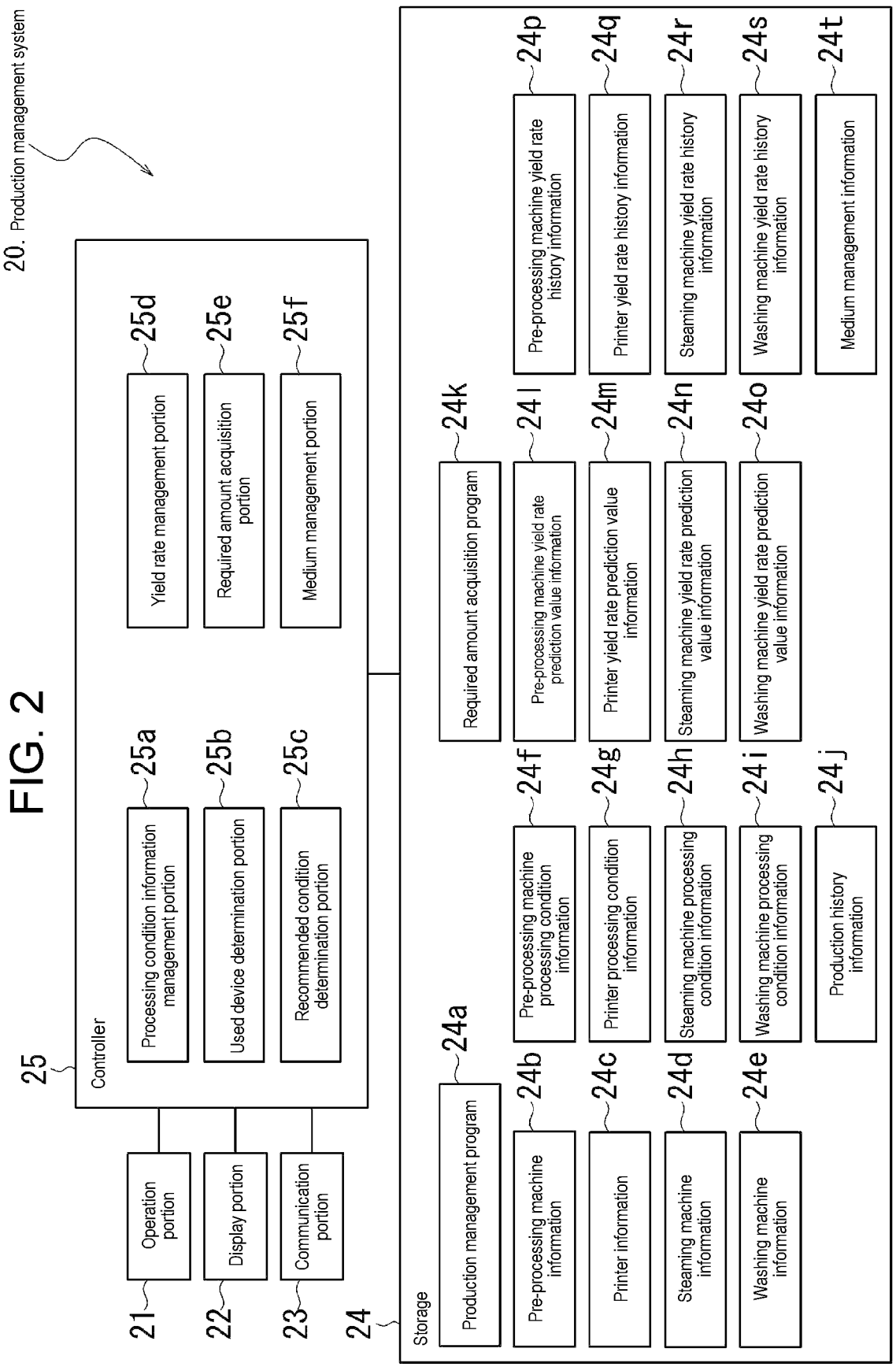
FIG. 2 is a block diagram of the production management system shown in FIG. 1 when configured by one computer.

FIG. 2 is a block diagram of the production management system 20 in a case where the production management system 20 is formed by one computer.

The production management system 20 illustrated in FIG. 2 includes an operation portion 21, a display portion 22, a communication portion 23, a storage 24, and a controller 25.

The operation portion 21 is an operation device such as a keyboard and a mouse. Various instructions are input to the production management system 20 via the operation portion 21.

The display portion 22 is a display device such as a liquid crystal display (LCD). Various types of information are displayed on the display portion 22.

The communication portion 23 is a communication device that communicates with an external device. The production management system 20 communicates with an external device in a wired or wireless manner via a network such as a LAN or the Internet or without the network.

The storage 24 is a nonvolatile storage device such as a semiconductor memory or a hard disk drive (HDD). The storage 24 stores various types of information and programs.

The controller 25 controls the entire production management system 20.

The storage 24 stores a production management program 24a and a required amount acquisition program 24k.

The production management program 24a is a management program for managing production of a product.

The required amount acquisition program 24k is a program for acquiring the length of the medium necessary for the production of the product, that is, the amount of the medium necessary for the production of the product.

A method of installing the production management program 24a and the required amount acquisition program 24k in the storage 24 may be any of the following methods.

(a) Install to the storage 24 of the production management system 20 at the manufacturing stage of the production management system 20.

(b) Additionally install to the storage 24 of the production management system 20 from an external storage medium such as a compact disk (CD), a digital versatile disk (DVD), or a universal serial bus (USB) memory.

(c) Additionally install to the storage 24 of the production management system 20 from the storage on the network.

The storage 24 stores pre-processing machine information 24b.

The pre-processing machine information 24b is information indicating the type and installing place of the pre-processing machine 30 included in the production system 10.

Figure 3:
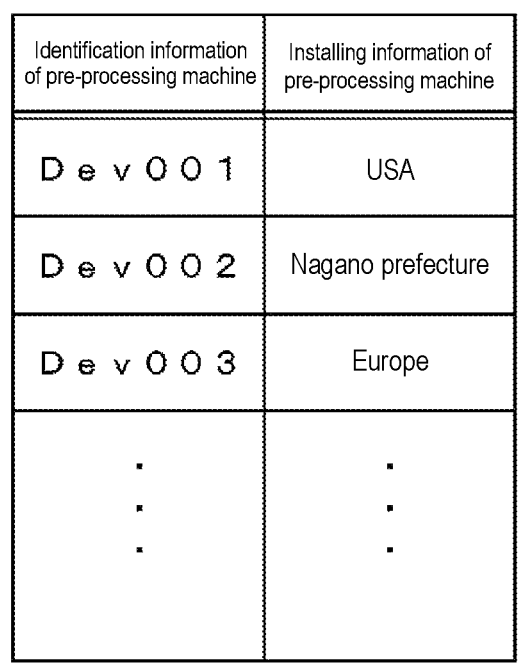
FIG. 3 is a diagram illustrating an example of pre-processing machine information illustrated in FIG. 2.

FIG. 3 is a diagram illustrating an example of the pre-processing machine information 24b.

As illustrated in FIG. 3, the pre-processing machine information 24b includes, as information items, identification information of a pre-processing machine and information indicating an installing place of the pre-processing machine.

Information indicating the installing place of the pre-processing machine is stored in association with the identification information of the pre-processing machine.

The information indicating the installing place of the pre-processing machine may be contents in units of countries such as the United States, Europe, China, and Japan, or may be contents in units of prefectures or regions in Japan such as Nagano prefecture, Tokyo, and Hokkaido.

As illustrated in FIG. 2, the storage 24 stores printer information 24c.

The printer information 24c is information indicating the type and installing place of the printer 40 included in the production system 10.

As in the case of the pre-processing machine information 24b described above, the printer information 24c includes, as information items, identification information of the printer and information indicating an installing place of the printer.

The information indicating the installing place of the printer is stored in association with the identification information of the printer.

The storage 24 stores steaming machine information 24d.

The steaming machine information 24d is information indicating the type and installing place of the steaming machine 50 included in the production system 10.

As in the case of the pre-processing machine information 24b described above, the steaming machine information 24d includes, as information items, identification information of the steaming machine and information indicating an installing place of the steaming machine.

The information indicating the installing place of the steaming machine 50 is stored in association with the identification information of the steaming machine.

The storage 24 stores washing machine information 24e.

The washing machine information 24e is information indicating a type and an installing place of the washing machine 60 included in the production system 10.

As in the case of the pre-processing machine information 24b described above, the washing machine information 24e includes, as information items, identification information of the washing machine and information indicating an installing place of the washing machine.

The information indicating the installing place of the washing machine is stored in association with the information indicating the installing place of the washing machine.

The storage 24 stores pre-processing machine processing condition information 24f.

The pre-processing machine processing condition information 24f is information indicating a recommended condition of pre-processing performed by the pre-processing machine.

The content of the pre-processing machine processing condition information 24f may be updated by the processing condition information management portion 25a to be described later when a product is produced by the production system 10.

The initial value of the content of the pre-processing machine processing condition information 24f may be provided from a manufacturer of the pre-processing machine. Moreover, it may be managed by the processing condition information management portion 25a.

FIG. 4 is a diagram illustrating an example of the pre-processing machine processing condition information 24f.

As illustrated in FIG. 4, the pre-processing machine processing condition information 24f includes, as information items, (a) information indicating the type of medium to be processed by the pre-processing machine, (b) information indicating the type of pre-processing agent to be used by the pre-processing machine, (c) information indicating the quality of the product, (d) information indicating the type of pre-processing machine, (e) information indicating the installing place of the pre-processing machine, and (f) information indicating the recommended condition of the processing by the pre-processing machine.

The (f) information indicating a recommended condition of the processing by the pre-processing machine is stored in association with the other information described above.

Note that, in FIG. 4, among the above-described information items, description on specific contents is omitted for (a) information indicating the type of medium to be processed by the pre-processing machine, (b) information indicating the type of pre-processing agent to be used by the pre-processing machine, (c) information indicating the quality of the product, and (f) information indicating the recommended condition of the processing by the pre-processing machine.

Here, the (c) information indicating the quality of the product is the quality of color in the product.

As illustrated in FIG. 2, the storage 24 stores printer processing condition information 24g.

The printer processing condition information 24g is information indicating a recommended condition of the printing process performed by the printer 40.

The contents of the printer processing condition information 24g may be updated by the processing condition information management portion 25a to be described later when a product is produced by the production system 10.

The initial value of the content of the printer processing condition information 24g may be provided from a manufacturer of the printer. Moreover, it may be managed by the processing condition information management portion 25a.

The printer processing condition information 24g includes, as information items, (a) information indicating the type of medium to be processed by the printer, (b) information indicating the type of ink to be used by the printer, (c) information indicating the quality of the product, (d) information indicating the type of printer, (e) information indicating the installing place of the printer, and (f) information indicating a recommended condition of printing process performed by the printer 40.

The (f) information indicating a recommended condition of printing process performed by the printer 40 is stored in association with the other information described above.

The storage 24 stores steaming machine processing condition information 24h.

The steaming machine processing condition information 24h is information indicating a recommended condition of processing by the steaming machine.

The content of the steaming machine processing condition information 24h may be updated by the processing condition information management portion 25a to be described later when a product is produced by the production system 10.

The initial value of the content of the steaming machine processing condition information 24h may be provided from a manufacturer of the steaming machine. Moreover, it may be managed by the processing condition information management portion 25a.

The steaming machine processing condition information 24h includes, as information items, (a) information indicating the type of medium to be processed by the steaming machine, (b) information indicating the quality of the product, (c) information indicating the type of steaming machine, (d) information indicating the installing place of the steaming machine, and (e) information indicating the recommended condition of the processing by the steaming machine.

The (e) information indicating the recommended condition of the processing by the steaming machine is stored in association with the other information described above.

The storage 24 stores washing machine processing condition information 24i.

The washing machine processing condition information 24i is information indicating a recommended condition of the processing by the washing machine.

The content of the washing machine processing condition information 24i may be updated by the processing condition information management portion 25a to be described later when a product is produced by the production system 10.

The initial value of the content of the washing machine processing condition information 24i may be provided from a manufacturer of the washing machine. Moreover, it may be managed by the processing condition information management portion 25a.

The washing machine processing condition information 24i includes, as information items, (a) information indicating the type of medium to be processed by the washing machine, (b) information indicating the quality of the product, (c) information indicating the type of washing machine, (d) information indicating the installing place of the washing machine, and (e) information indicating the recommended condition of the processing by the washing machine.

The (e) information indicating the recommended condition of the processing by the washing machine is stored in association with the other information described above.

The storage 24 stores production history information 24j.

The production history information 24j is information indicating a history of production of a product in the production system 10.

FIG. 5 is a diagram illustrating an example of the production history information 24j.

As illustrated in FIG. 5, the production history information 24j includes the following (a) to (r) as information items.

(a) Information indicating date and time of production, (b) information indicating target quality of a product to be produced, (c) information indicating the type of medium used for production, (d) information indicating the type of pre-processing machine used for production, (e) information indicating an installing place of the pre-processing machine used for production, (f) information indicating the type of pre-processing agent used for production, (g) information indicating a condition of processing by a pre-processing machine used for production, (h) information indicating the type of printer used for production, (i) information indicating an installing place of the printer used for production, (j) information indicating the type of ink used for production, (k) information indicating a condition of printing process by the printer used for production, (l) information indicating the type of steaming machine used for production, (m) information indicating an installing place of a steaming machine used for production, (n) information indicating a condition of processing by the steaming machine used for production, (o) information indicating the type of washing machine used for production, (p) information indicating an installing place of a washing machine used for production, (q) information indicating a condition of processing by the washing machine used for production, and (r) information indicating whether or not a product to be produced has target quality.

In the production history information 24j, the information items (a) to (r) are prepared for each product generated in the production system 10.

Note that, in FIG. 5, description on specific contents is omitted for other information items except for (r) information indicating whether or not a product to be produced has target quality among the above-described information items.

The storage 24 stores pre-processing machine yield rate prediction value information 24l.

The pre-processing machine yield rate prediction value information 24l is information indicating a prediction value of the yield rate of the medium when the medium is processed in the pre-processing machine.

FIG. 6 is a diagram illustrating an example of the pre-processing machine yield rate prediction value information 24*l*.

The pre-processing machine yield rate prediction value information 24*l* includes, as information items, for example, (a) identification information of the pre-processing machine, (b) identification information of the operator of the pre-processing machine, (c) information indicating the type of medium to be processed by the pre-processing machine, (d) information indicating the type of pre-processing agent to be used by the pre-processing machine, and (e) information indicating the condition of processing by the pre-processing machine.

Further, the pre-processing machine yield rate prediction value information 24*l* includes (f) information indicating the prediction value of the yield rate for each combination of these information items.

The following conditions are exemplified as conditions for the processes by the pre-processing machine.

(a) The conveyance speed of the region where the pre-processing is performed in the medium, (b) the tension acting on the region where the pre-processing is performed in the medium, and (c) the temperature in the vicinity of the region where the pre-processing is performed in the medium.

Here, in the conveyor path of the medium in the pre-processing machine, the length of the region where the pre-processing is performed in the medium is constant. Thus, the conveyance speed in the region where the pre-processing is performed in the medium is proportional to the pre-processing time (the execution time of pre-processing) in the region where the pre-processing is performed in the medium.

Note that, in FIG. 6, description of specific contents is omitted for the (c) information indicating the type of medium to be processed by the pre-processing machine, (d) information indicating the type of pre-processing agent to be used by the pre-processing machine, and (e) information indicating the condition of processing by the pre-processing machine.

As illustrated in FIG. 2, the storage 24 stores printer yield rate prediction value information 24*m*.

The printer yield rate prediction value information 24*m* is information indicating a prediction value of the yield rate of the medium when the medium is processed (print processed) in the printer.

The printer yield rate prediction value information 24*m* includes, as information items, (a) identification information of a printer, (b) identification information of an operator of the printer, (c) information indicating the type of medium to be processed by the printer, (d) information indicating the type of ink to be used by the printer, and (e) information indicating a condition of processing by the printer.

Further, the printer yield rate prediction value information 24*m* includes (f) information indicating a prediction value of the yield rate for each combination of these information items.

The following are exemplified as condition of processing by the printer.

(a) The conveyance speed of the region where printing is performed in the medium, and (b) the drying time of the region where printing is performed in the medium.

Here, in the conveyor path of the medium in the printer, the length of the region where printing is performed on the medium is constant. Thus, the conveyance speed in the region where printing is performed in the medium is proportional to the execution time of printing in the region where printing is performed in the medium.

The storage 24 stores steaming machine yield rate prediction value information 24*n*.

The steaming machine yield rate prediction value information 24*n* is information indicating a prediction value of the yield rate of the medium when the medium is processed in the steaming machine.

Similarly to the pre-processing machine yield rate prediction value information 24*l* described above, the steaming machine yield rate prediction value information 24*n* includes, as information items, (a) identification information of the steaming machine, (b) identification information of the operator of the steaming machine, (c) information indicating the type of medium to be processed by the steaming machine, (d) information indicating the type of water to be used by the steaming machine, and (e) information indicating the condition of processing by the steaming machine.

Further, the steaming machine yield rate prediction value information 24*n* includes (f) information indicating the prediction value of the yield rate for each combination of these information items.

The following are exemplified as condition of processing by the steaming machine.

(a) The conveyance speed of the region where the steaming process is performed in the medium, (b) the temperature in the vicinity of the region where the steaming process is performed in the medium, and (c) the humidity in the vicinity of the region where the steaming process is performed in the medium.

Here, in the conveyor path of the medium in the steaming machine, the length of the region where the steaming process is performed in the medium is constant. Thus, the conveyance speed in the region where the steaming process is performed in the medium is proportional to the execution time in the region where the steaming process is performed in the medium.

The storage 24 stores washing machine yield rate prediction value information 24*o*.

The washing machine yield rate prediction value information 24*o* is information indicating a prediction value of the yield rate of the medium when the medium is processed in the washing machine.

Similarly to the pre-processing machine yield rate prediction value information 24*l*, the washing machine yield rate prediction value information 24*o* includes, as information items, (a) identification information of the washing machine, (b) identification information of the operator of the washing machine, (c) information indicating the type of medium to be processed by the washing machine, (d) information indicating the type of water to be used by the washing machine, and (e) information indicating the condition of the processing by the washing machine.

Further, the washing machine yield rate prediction value information 24*o* includes (f) information indicating the prediction value of the yield rate for each combination of these information items.

The following are exemplified as condition of processing by the washing machine.

(a) The conveyance speed of the region where the washing process is performed in the medium, (b) the tension acting on the region where the washing process is performed in the medium, (c) the temperature in the vicinity of the region where the washing process is performed in the medium, and (d) the timing of replacing water in the washing machine.

Here, in the conveyor path of the medium in the washing machine, the length of the region where the washing process is performed in the medium is constant. Thus, the conveyance speed in the region where the steaming process is performed in the medium is proportional to the execution time of the washing process in the region where the steaming process is performed in the medium.

Further, the timing of replacing the water in the washing machine is a condition of how much water is to be replaced every time the washing process is performed on the medium of which length.

The storage 24 stores pre-processing machine yield rate history information 24p.

The pre-processing machine yield rate history information 24p is information indicating a history of an actual yield rate of the medium when the medium is processed in the pre-processing machine.

FIG. 7 is a diagram illustrating an example of the pre-processing machine yield rate history information 24p.

As illustrated in FIG. 7, the pre-processing machine yield rate history information 24p includes, as the information items, the following (a) to (f).

(a) Information indicating the date and time of processing, (b) identification information of the pre-processing machine, (c) identification information of an operator of the pre-processing machine, (d) information indicating the type of medium to be processed by the pre-processing machine, (e) information indicating the type of pre-processing agent to be used by the pre-processing machine, (f) information indicating condition of processing by the pre-processing machine, and (g) information indicating the yield rate. These information items are generated each time the pre-processing machine performs processing.

Note that, in FIG. 7, description of specific contents is omitted for the (d) information indicating the type of medium to be processed by the pre-processing machine, (e) information indicating the type of pre-processing agent to be used by the pre-processing machine, and (f) information indicating the condition of processing by the pre-processing machine.

Further, in the pre-processing machine yield rate history information 24p, the contents of these information items are stored for each processing in the pre-processing machine.

As illustrated in FIG. 2, the storage 24 stores printer yield rate history information 24q.

The printer yield rate history information 24q is information indicating a history of an actual yield rate of the medium when the medium is processed (print processed) in the printer.

Similarly to the pre-processing machine yield rate history information 24p, the printer yield rate history information 24q includes, as information items, (a) information indicating the date and time of processing, (b) identification information of the printer, (c) identification information of the operator of the printer, (d) information indicating the type of medium processed by the printer, (e) information indicating the type of ink to be used by the printer, (f) information indicating condition of processing by the printer, and (g) yield rate.

Further, the printer yield rate history information 24q stores the contents of these information items for each processing in the printer.

The storage 24 stores steaming machine yield rate history information 24r.

The steaming machine yield rate history information 24r is information indicating a history of an actual yield rate of the medium when the medium is processed in the steaming machine.

Similarly to the pre-processing machine yield rate history information 24p, the steaming machine yield rate history information 24r includes, as information items, (a) information indicating the date and time of processing, (b) identification information of the steaming machine, (c) identification information of the operator of the steaming machine, (d) information indicating the type of medium processed by the steaming machine, (e) information indicating the type of water to be used by the steaming machine, (f) information indicating the condition of processing by the steaming machine, and (g) yield rate in the steaming machine.

Further, in the steaming machine yield rate history information 24r, the contents of these information items are stored for each processing in the steaming machine.

The storage 24 stores washing machine yield rate history information 24s.

The washing machine yield rate history information 24s is information indicating a history of an actual yield rate of the medium when the medium is processed in the washing machine.

Similarly to the pre-processing machine yield rate history information 24p, the washing machine yield rate history information 24s includes, as information items, (a) information indicating date and time of processing, (b) identification information of a washing machine, (c) identification information of an operator of the washing machine, (d) information indicating the type of medium processed by the washing machine, (e) information indicating the type of water to be used by the washing machine, (f) information indicating a condition of processing by the washing machine, and (g) yield rate.

Further, in the washing machine yield rate history information 24s, the contents of these information items are stored for each processing in the washing machine.

The storage 24 stores medium management information 24t.

The medium management information 24t is information for managing the medium.

FIG. 8 is a diagram illustrating an example of the medium management information 24t.

As illustrated in FIG. 8, the medium management information 24t includes, as information items, (a) identification information of a medium, (b) information indicating a length of the medium, and (c) information indicating a state of the medium.

In the medium management information 24t, the (b) information indicating the length of the medium and the (c) information indicating the state of the medium are associated with the (a) identification information of the medium.

For the information indicating the state of the medium, "unprocessed state", "pre-processed state", "printed state", "steaming processed state", and "produced state" are prepared.

A medium whose information indicating the state of the medium is "unprocessed state" refers to a medium in a state where the pre-processing is not performed.

A medium whose information indicating the state of the medium is "pre-processed state" refers to a medium in a state after the pre-processing and before the printing.

A medium whose information indicating the state of the medium is "printed state" refers to a medium in a state after the printing and before the steaming process.

A medium whose information indicating the state of the medium is "steaming processed state" refers to a medium in a state after the steaming process and before the washing process.

A medium whose information indicating the state of the medium is "produced state" refers to a medium in a state the production is completed after the washing process.

As illustrated in FIG. 2, the controller 25 of the production management system 20 includes, for example, a central processing unit (CPU) (not illustrated), a read only memory (ROM) (not illustrated), and a random access memory (RAM) (not illustrated).

The ROM stores programs and various data. The RAM is used as a work area of the CPU.

The CPU performs the program stored in the ROM or the storage 24.

The controller 25 functions as a processing condition information management portion 25a, a used device determination portion 25b, and a recommended condition determination portion 25c by performing processes according to the production management program 24a stored in the storage 24.

The processing condition information management portion 25a manages the processing condition information.

The used device determination portion 25b automatically determines an electronic device scheduled to be used for generating a product based on a specific algorithm.

The recommended condition determination portion 25c determines the recommended condition of processing by the electronic device scheduled to be used for generating the product.

Furthermore, the controller 25 functions as a yield rate management portion 25d, a required amount acquisition portion 25e, and a medium management portion 25f by performing processes according to the required amount acquisition program 24k stored in the storage 24.

The yield rate management portion 25d manages a prediction value of the yield rate of the medium in each step of generating a product.

The required amount acquisition portion 25e acquires information indicating the amount of media necessary for each step of generating the product.

The medium management portion 25f manages media.

The production management system 20 forms a production system that acquires the amount of media necessary for producing a product.

Hereinafter, the operation of the production system 10 according to the present embodiment will be described.

First Embodiment

First, a case where a product is produced by processes performed according to the production management program 24a will be described.

Figure 9:
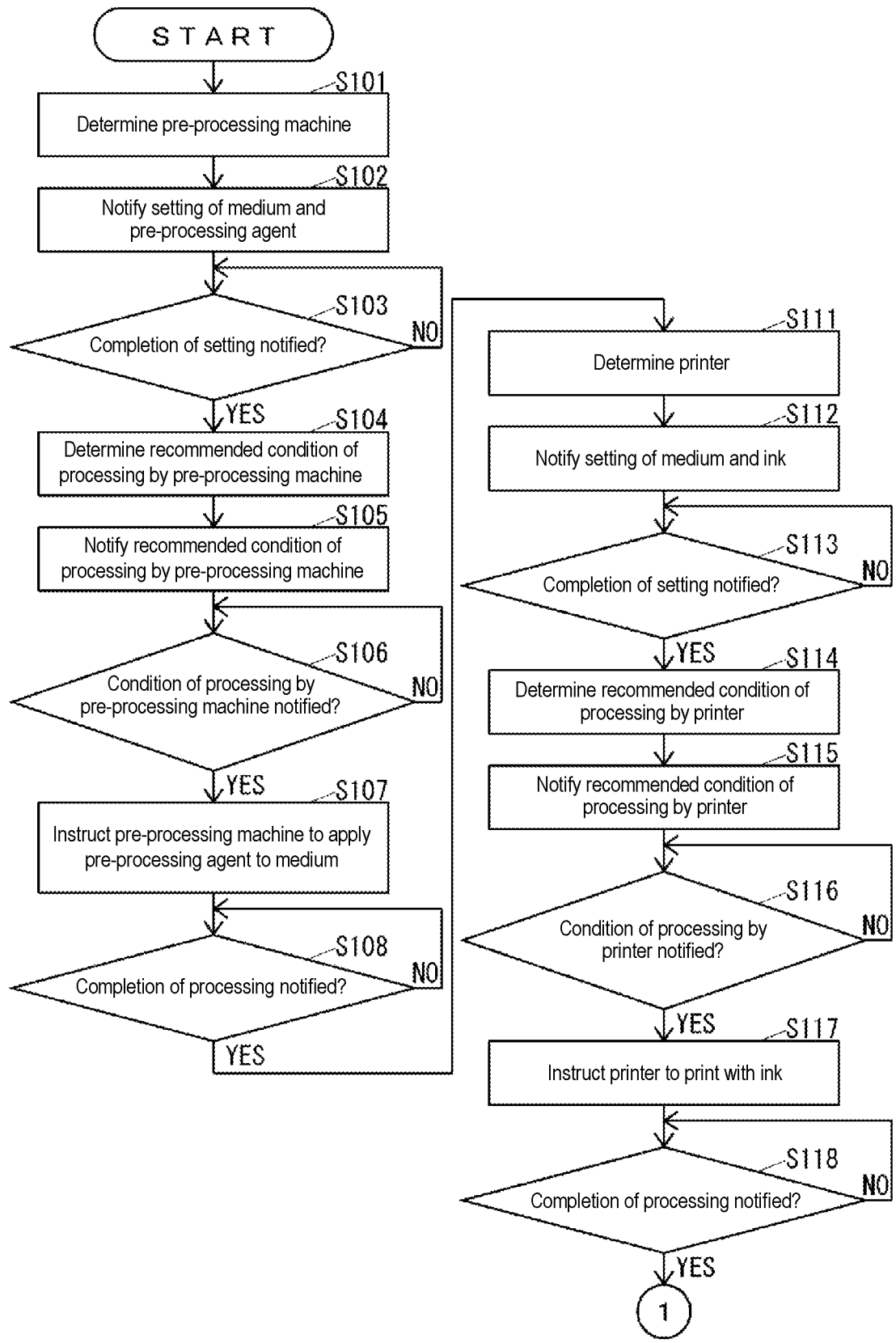
FIG. 9 is a flowchart of a part of an operation of the production management system illustrated in FIG. 2 when producing a product.
Figure 10:
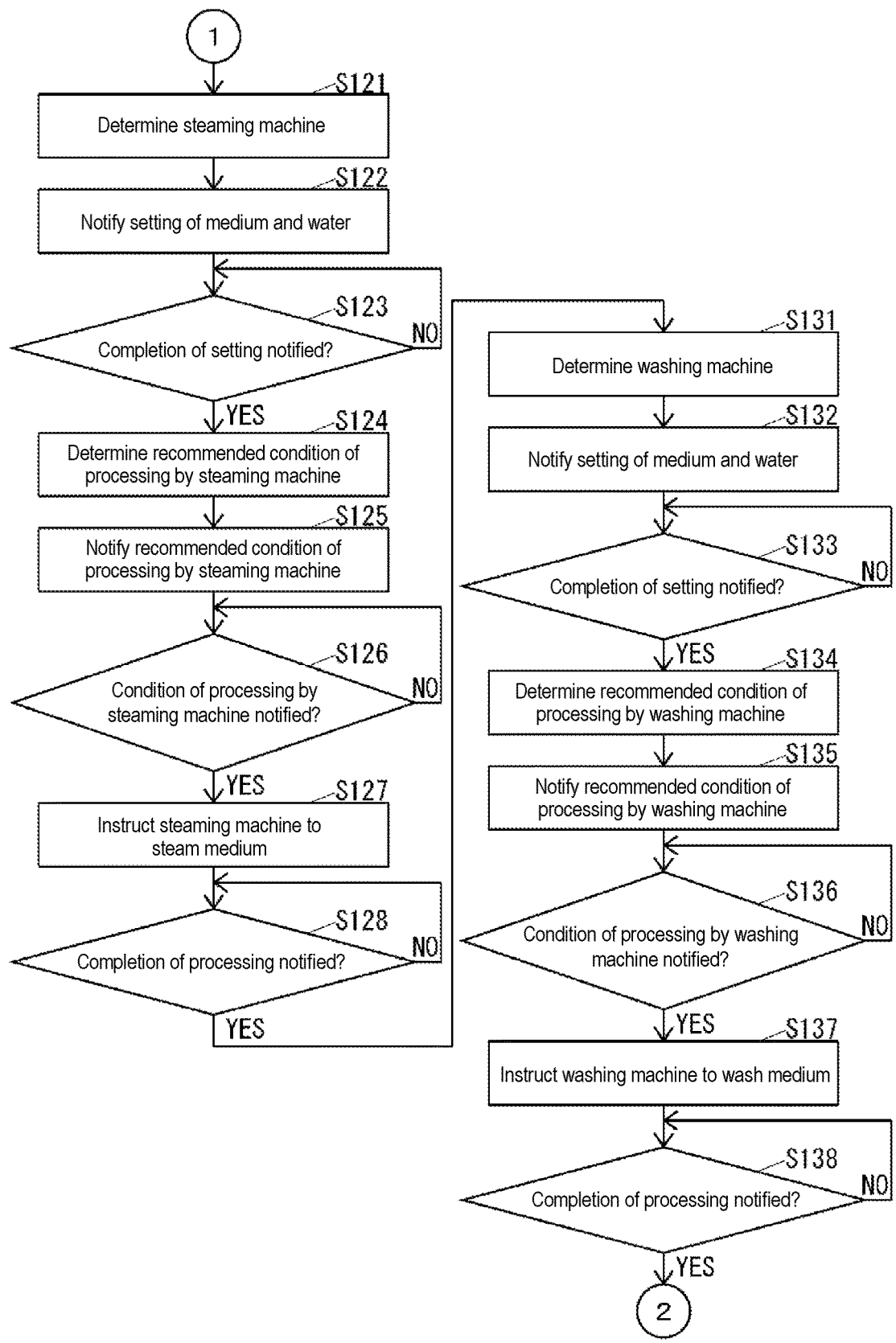
FIG. 10 is a flowchart continuing to the flowchart shown in FIG. 9.
Figure 11:
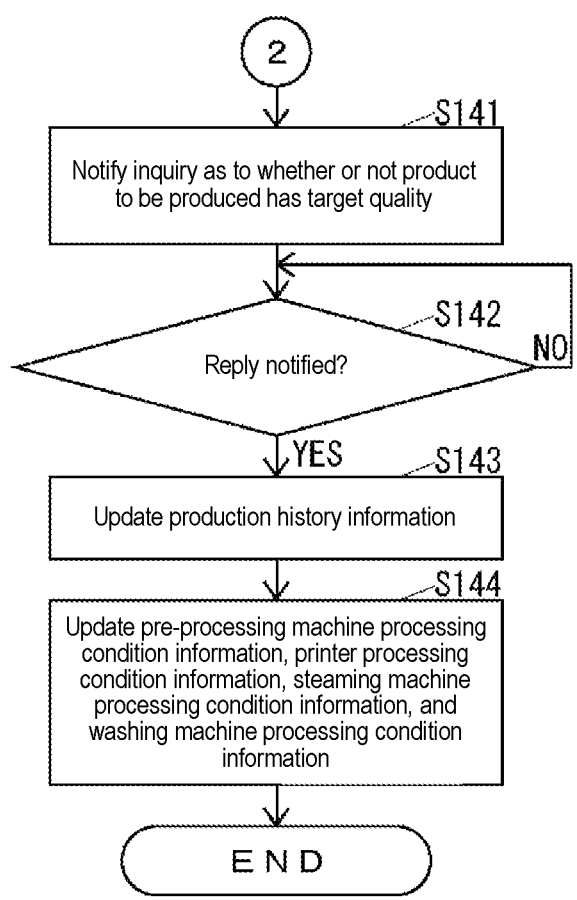
FIG. 11 is a flowchart continuing to the flowchart shown in FIG. 10.

FIG. 9 to FIG. 11 are flowcharts when the process is executed according to the production management program 24a.

When receiving a job (hereinafter, referred to as "target job") instructing production of a product via the communication portion 23 at the time of activation of the production management program 24a, the controller 25 performs the processes illustrated in FIG. 9 to FIG. 11.

The used device determination portion 25b determines a pre-processing machine that applies a pre-processing agent to the medium (S101).

Here, when the pre-processing machine is instructed in the target job, the used device determination portion 25b may determine the pre-processing machine instructed in the target job as a pre-processing machine that applies the pre-processing agent to the medium.

In addition, when receiving an instruction designating a pre-processing machine via the communication portion 23 after receiving the target job, the used device determination portion 25b may determine the designated pre-processing machine as a pre-processing machine that applies the pre-processing agent to the medium.

In addition, the used device determination portion 25b may determine a pre-processing machine automatically selected based on a specific algorithm from among the pre-processing machines registered in the pre-processing machine information 24b as a pre-processing machine that applies a pre-processing agent to the medium.

Here, for example, an arbitrary algorithm such as an algorithm for selecting a pre-processing machine having the smallest number of jobs waiting to be executed or an algorithm for selecting a pre-processing machine having a specific function or performance such as production capacity can be selected as the specific algorithm.

When the pre-processing machine that applies the pre-processing agent to the medium is determined, the controller 25 notifies the operator of the determined processing machine of an instruction to request setting of the medium and the pre-processing agent in the determined processing machine (S102).

Here, a medium on which the target job is to be performed and a pre-processing agent are designated in the target job received by the controller 25. Therefore, the instruction to be notified to the operator includes the type (e.g., the identification number) of the medium to be set in the pre-processing machine and the type (e.g., a product name, etc.) of processing agent.

The instruction to the operator may be notified to the display portion (not illustrated) of the pre-processing machine determined in S101. Further, the display portion may be a display portion of an electronic device (e.g., the information terminal held by the operator) different from the pre-processing machine.

Thus, upon receiving the notification in S102, the operator of the pre-processing machine sets the designated medium and the pre-processing agent in the designated pre-processing machine.

In the present embodiment, when the setting of the designated medium and the pre-processing agent in the designated pre-processing machine is completed, the operator notifies the production management system 20 via an operation portion (not illustrated) of the pre-processing machine or an electronic device different from the pre-processing machine.

When the controller 25 is notified that the setting of the medium and the pre-processing agent is completed (S103, YES) after the process of S102, the recommended condition determination portion 25c determines the recommended condition of processing by the pre-processing machine determined in S101 (S104).

Here, in the pre-processing machine processing condition information 24f described above, information indicating a recommended condition of processing by the pre-processing machine is stored in association with the following information.

(a) Information indicating the type of medium to be processed by the pre-processing machine, (b) information indicating the type of pre-processing agent to be used by the pre-processing machine, (c) information indicating the quality of the product, (d) information indicating the type of pre-processing machine, and (d) information indicating the installing place of the pre-processing machine.

The recommended condition determination portion 25c refers to the pre-processing machine processing condition information 24f to acquire the recommended condition of processing in the pre-processing machine, and determines the acquired condition as the condition of processing by the pre-processing machine determined in S101 (S104).

The recommended condition determination portion 25c notifies the user (operator) of the recommended condition of processing determined in S104 (S105).

The notification to the operator may be notified to the display portion (not illustrated) of the pre-processing machine determined in S101. Further, the display portion may be a display portion of an electronic device (e.g., the information terminal held by the operator) different from the pre-processing machine.

Thus, upon receiving the notification in S105, the operator of the pre-processing machine sets the designated processing condition in the designated pre-processing machine.

Note that the condition of the processing to be set in the pre-processing machine may be changed from the condition of the processing designated in the notification of S105.

In the present embodiment, when the designated processing condition for the designated pre-processing machine is set, the operator notifies the production management system 20 via an operation portion (not illustrated) of the pre-processing machine or an electronic device different from the pre-processing machine.

When notified that the setting of the processing condition is completed in the pre-processing machine (S106, YES) after the process of S105, the controller 25 instructs the pre-processing machine determined in S101 to apply the pre-processing agent to the medium (S107).

As a result, upon receiving the instruction in S107, the pre-processing machine applies the pre-processing agent to the medium according to the instruction in S107.

Then, when the application of the pre-processing agent to the medium is completed, the production management system 20 is notified that the process of applying the pre-processing agent to the medium is completed.

When the controller 25 is notified that the process of applying the pre-processing agent to the medium is completed (S108, YES) after the process of S107, the used device determination portion 25b determines a printer to perform printing on the medium (S111).

Here, when the printer is instructed in the target job, the used device determination portion 25b may determine the printer instructed in the target job as the printer to perform printing.

Further, when receiving a new instruction via the communication portion 23 after receiving the target job and when a printer is designated in the newly received instruction, the used device determination portion 25b may determine the printer designated in the newly received instruction as the printer to perform printing.

The used device determination portion 25b may determine a printer automatically selected based on a specific algorithm among the plurality of printers registered in the printer information 24c as the printer to perform printing.

Here, for example, an arbitrary algorithm such as an algorithm for selecting a printer having the smallest number of jobs waiting to be executed or an algorithm for selecting a printer having a specific function or performance such as production capacity can be selected as the specific algorithm.

When the printer to perform printing is determined, the controller 25 notifies an operator of the determined printer of an instruction to request setting of the medium and the ink in the determined printer (S112).

The instruction to the operator may be notified to the display portion (not illustrated) of the printer determined in S111. Further, the display portion may be a display portion of an electronic device (e.g., the information terminal held by the operator) different from the printer.

Thus, upon receiving the notification in S112, the operator of the printer sets the designated medium and ink in the designated printer.

In the present embodiment, when the setting of the designated medium and ink in the designated printer is completed, the operator notifies the production management system 20 via an operation portion (not illustrated) of the printer or an electronic device different from the printer.

When the controller 25 is notified that the setting of the medium and the ink is completed (S113, YES) after the process of S112, the recommended condition determination portion 25c determines the recommended condition of the printing process by the printer determined in S111 (S114).

Here, in the above-described printer processing condition information 24g, information indicating a recommended condition of processing by the printer is stored in association with the following information.

(a) Information indicating the type of medium to be processed by the printer, (b) information indicating the type of ink to be used by the printer, (c) information indicating the quality of the product, (d) information indicating the type of printer, and (d) information indicating the installing place of the printer.

The recommended condition determination portion 25c refers to the printer processing condition information 24g to acquire the recommended condition of the printing process in the printer, and determine the acquired condition as the condition of processing by the printer determined in S111 (S114).

The recommended condition determination portion 25c notifies the operator of the recommended condition of the printing process determined in S114 (S115).

Here, the notification to the operator may be notified to a display portion (not illustrated) of the printer determined in S111. Further, the display portion may be a display portion of an electronic device (e.g., the information terminal held by the operator) different from the printer.

Thus, upon receiving the notification in S115, the operator of the printer sets the designated printing process condition in the designated printer.

The conditions of the printing process to be set in the printer may be changed from the condition of the processing designated in the notification of S115.

In the present embodiment, when the setting of the designated printing process condition in the designated printer is completed, the operator notifies the production management system 20 via an operation portion (not illustrated) of the printer or an electronic device different from the printer.

When notified that the setting of the conditions of printing process is completed in the printer (S116, YES) after the notification in S115, the controller 25 instructs the printer determined in S111 to perform printing with ink on the medium (S117).

As a result, upon receiving the instruction in S117, the printer performs printing using ink on the medium according to the instruction in S117.

Then, when the printing on the medium is completed, the production management system 20 is notified that the printing on the medium is completed.

When the controller 25 is notified that the printing process on the medium is completed (S118, YES) after the instruction in S117, the used device determination portion 25b determines a steaming machine to perform the steaming process (steaming process) on the medium (S121).

Here, when the steaming machine is instructed in the target job, the used device determination portion 25b may determine the steaming machine instructed in the target job as the steaming machine to perform the steaming process.

Further, when receiving a new instruction via the communication portion 23 after receiving the target job and when a steaming machine is designated in the newly received instruction, the used device determination portion 25b may determine the steaming machine designated in the newly received instruction as the steaming machine to perform the steaming process.

The used device determination portion 25b may determine a steaming machine automatically selected based on a specific algorithm among the plurality of steaming machines registered in the steaming machine information 24d as the steaming machine to perform the steaming process.

Here, for example, an arbitrary algorithm such as an algorithm for selecting a steaming machine having the smallest number of jobs waiting to be executed or an algorithm for selecting a steaming machine having a specific function or performance such as production capacity can be selected as the specific algorithm.

When the steaming machine to perform the steaming process is determined, the controller 25 notifies an operator of the determined steaming machine of an instruction to request setting of the medium and water in the determined steaming machine (S122).

The instruction to the operator may be notified to the display portion (not illustrated) of the steaming machine determined in S121. Further, the display portion may be a display portion of an electronic device (e.g., the information terminal held by the operator) different from the steaming machine.

Thus, upon receiving the notification in S122, the operator of the steaming machine sets the designated medium and water in the designated steaming machine.

In the present embodiment, when the setting of the designated medium and water in the designated steaming machine is completed, the operator notifies the production management system 20 via an operation portion (not illustrated) of the steaming machine or an electronic device different from the steaming machine.

When the controller 25 is notified that the setting of the medium and water is completed (S123, YES) after the process of S122, the recommended condition determination portion 25c determines the recommended condition of processing by the steaming machine determined in S121 (S124).

Here, in the steaming machine processing condition information 24h described above, information indicating a recommended condition of processing by the steaming machine is stored in association with the following information.

(a) Information indicating the type of medium to be processed by the steaming machine, (b) information indicating the target quality of the product, (c) information indicating the type of steaming machine, and (d) information indicating the installing place of the steaming machine.

The recommended condition determination portion 25c refers to the steaming machine processing condition information 24h to acquire the recommended condition of processing in the steaming machine, and determines the acquired condition as the condition of processing by the steaming machine determined in S121 (S124).

The recommended condition determination portion 25c notifies the operator of the recommended condition of the processing determined in S124 (S125).

Here, the notification to the operator may be notified to the display portion (not illustrated) of the steaming machine determined in S121. Further, the display portion may be a display portion of an electronic device (e.g., the information terminal held by the operator) different from the steaming machine.

Thus, upon receiving the notification in S125, the operator of the steaming machine sets the designated processing conditions in the designated steaming machine.

Note that the conditions of processing to be set in the steaming machine may be changed from the conditions of processing designated in the notification of S125.

In the present embodiment, when the designated processing condition for the designated steaming machine is set, the operator notifies the production management system 20 via an operation portion (not illustrated) of the steaming machine or an electronic device different from the steaming machine.

When notified that the setting of the processing condition is completed in the steaming machine (S126, YES) after the notification in S125, the controller 25 instructs the steaming machine determined in S121 to execute the steaming process (steaming process) on the medium (S127).

Thus, upon receiving the instruction in S127, the steaming machine performs the steaming process on the medium according to the instruction in S127.

Then, when the steaming process on the medium is completed, the production management system 20 is notified that the steaming process on the medium is completed.

When the controller 25 is notified that the steaming process on the medium is completed (S128, YES) after the instruction in S127, the used device determination portion 25b determines a washing machine to perform washing (washing process) of the medium (S131).

Here, when the washing machine is instructed in the target job, the used device determination portion 25b may determine the washing machine instructed in the target job as the washing machine to perform the washing process.

Further, when receiving a new instruction via the communication portion 23 after receiving the target job and when a washing machine is designated in the newly received instruction, the used device determination portion 25b may determine the washing machine designated in the newly received instruction as the washing machine to perform the washing process.

Further, the used device determination portion 25b may determine a washing machine automatically selected based on a specific algorithm among a plurality of washing machines registered in the washing machine information 24e as the washing machine to perform the washing process.

Here, for example, an arbitrary algorithm such as an algorithm for selecting a washing machine having the smallest number of jobs waiting to be executed or an algorithm for selecting a washing machine having a specific function or performance such as production capacity can be selected as the specific algorithm.

When the washing machine to perform the washing process is determined, the controller 25 notifies the operator of the determined washing machine of an instruction to request setting of the medium and water to the determined washing machine (S132).

The instruction to the operator may be notified to a display portion (not illustrated) of the washing machine determined in S131. Further, the display portion may be a display portion of an electronic device (e.g., the information terminal held by the operator) different from the washing machine.

Thus, upon receiving the notification in S132, the operator of the washing machine sets the designated medium and water in the designated washing machine.

In the present embodiment, when the setting of the designated medium and water in the designated washing machine is completed, the operator notifies the production management system 20 via an operation portion (not illustrated) of the washing machine or an electronic device different from the washing machine.

When the controller 25 is notified that the setting of the medium and water is completed (S133, YES) after the process of S132, the recommended condition determination portion 25c determines the recommended condition of processing by the washing machine determined in S131 (S134).

Here, in the washing machine processing condition information 24i described above, information indicating a recommended condition of processing by the washing machine is stored in association with the following information.

(a) Information indicating the type of medium to be processed by the washing machine, (b) information indicating the target quality of the product, (c) information indicating the type of washing machine, and (d) information indicating the installing place of the washing machine.

The recommended condition determination portion 25c refers to the washing machine processing condition information 24i to acquire the recommended condition of processing in the washing machine, and determines the acquired condition as the condition of processing by the washing machine determined in S131 (S134).

The recommended condition determination portion 25c notifies the user of the recommended condition of processing by the washing machine determined in S134 (S135).

Here, the notification to the operator may be notified to a display portion (not illustrated) of the washing machine determined in S131. Further, the display portion may be a display portion of an electronic device (e.g., the information terminal held by the operator) different from the washing machine.

Thus, upon receiving the notification in S135, the operator of the washing machine sets the designated processing conditions in the designated washing machine.

Note that the conditions of processing to be set in the washing machine may be changed from the conditions of processing designated in the notification of S135.

In the present embodiment, when the designated processing condition for the designated washing machine is set, the operator notifies the production management system 20 via an operation portion (not illustrated) of the washing machine or an electronic device different from the washing machine.

When notified that the setting of the processing condition is completed in the washing machine (S136, YES) after the process of S135, the controller 25 instructs the washing machine determined in S121 to execute the washing process on the medium (S137).

Thus, upon receiving the instruction in S137, the washing machine performs the washing process on the medium according to the instruction in S137.

Then, when the washing process on the medium is completed, the production management system 20 is notified that the washing process on the medium is completed.

When the controller 25 is notified that the washing process on the medium is completed (S138, YES) after the process of S137, the controller 25 notifies the user of a notification for confirming whether or not the medium on which the washing process is completed, that is, the product to be produced has been obtained with the target quality (S141).

Here, the user may be, for example, the operator of the washing machine determined in S131.

The notification to the operator may be notified to a display portion (not illustrated) of the washing machine determined in S131. Further, the display portion may be a display portion of an electronic device (e.g., the information terminal held by the operator) different from the washing machine. Furthermore, in a case where the electronic device (e.g., the information terminal held by the operator) of the notification destination is set in advance, the notification may be given to the set electronic device.

In the present embodiment, the operator who has received the notification notifies the production management system 20 via the electronic device of a reply as to whether or not the medium on which the washing process has been completed, that is, the product to be produced has been obtained with the target quality.

When receiving the reply from the user side after the process of S141 (S142, YES), the processing condition information management portion 25a updates the information related to the current production among the information included in the production history information 24j (S143).

Here, as described above, the production history information 24j includes the following information items (a) to (r).

(a) Information indicating date and time of production, (b) information indicating target quality of a product to be produced, (c) information indicating the type of medium used for production, (d) information indicating the type of pre-processing machine used for production, (e) information indicating an installing place of the pre-processing machine used for production, (f) information indicating the type of pre-processing agent used for production, (g) information indicating a condition of processing by a pre-processing machine used for production, (h) information indicating the type of printer used for production, (i) information indicating an installing place of the printer used for production, (j) information indicating the type of ink used for production, (k) information indicating a condition of processing by the printer used for production, (l) information indicating the type of steaming machine used for production, (m) information indicating an installing place of a steaming machine used for production, (n) information indicating a condition of processing by the steaming machine used for production, (o) information indicating the type of washing machine used for production, (p) information indicating an installing place of a washing machine used for production, (q) information indicating a condition of processing by the washing machine used for production, and (r) information indicating whether or not a product to be produced has target quality.

Among the information items described above, specific contents of (b) information indicating target quality of a product to be produced, (c) information indicating the type of medium used for production, (f) information indicating the type of pre-processing agent used for production, and (f)

information indicating the type of pre-processing agent used for production are determined in the target job described above.

Therefore, the processing condition information management portion 25a refers to the target job and updates the information regarding these information items.

Among the information items described above, the specific contents of (d) information indicating the type of pre-processing machine used for production and (e) information indicating an installing place of the pre-processing machine used for production are updated based on the type and the installing place of the pre-processing machine determined in S101.

Among the information items described above, the specific contents of (h) information indicating the type of printer used for production and (i) information indicating an installing place of the printer used for production are updated based on the type and the installing place of the printer determined in S111.

Among the information items described above, the specific contents of (l) information indicating the type of steaming machine used for production and (m) information indicating an installing place of a steaming machine used for production are updated based on the type and the installing place of the steaming machine determined in S121.

Among the information items described above, the specific contents of (o) information indicating the type of washing machine used for production and (p) information indicating an installing place of a washing machine used for production are updated based on the type and the installing place of the washing machine determined in S131.

Among the information items described above, the specific content of (g) information indicating a condition of processing by a pre-processing machine used for production is updated based on the recommended condition of processing determined in S104.

Note that when the processing condition is changed by the operator of the pre-processing machine, the change in the processing condition is indicated in the notification from the processing machine side in S106. Therefore, when the recommended condition of processing determined in S104 has been changed, the recommended condition is updated based on the condition of processing after the change.

Among the information items described above, the specific content of (k) information indicating a condition of processing by the printer used for production is updated based on the recommended condition of processing determined in step S114.

Note that when the processing condition is changed by the operator of the printer, the change in the processing condition is indicated in the notification from the printer side in S116. Therefore, when the recommended condition of processing determined in S114 has been changed, the recommended condition is updated based on the condition of processing after the change.

Among the information items described above, the specific content of (n) information indicating a condition of processing by the steaming machine used for production is updated based on the recommended condition of processing determined in step S124.

Note that when the processing condition is changed by the operator of the steaming machine, the change in the processing condition is indicated in the notification from the steaming machine side in S126. Therefore, when the recommended condition of processing determined in S124 has been changed, the recommended condition is updated based on the condition of processing after the change.

Among the above information items, (q) information indicating a condition of processing by the washing machine used for production is updated based on the recommended condition of processing determined in step S134.

Note that when the processing condition is changed by the operator of the washing machine, the change in the processing condition is indicated in the notification from the washing machine side in S136. Therefore, when the recommended condition of processing determined in S134 has been changed, the recommended condition is updated based on the condition of processing after the change.

As (r) information indicating whether or not a product to be produced has target quality among the above information items, the content of the reply from the operator side received in S142 is input.

Further, the specific content of (a) information indicating date and time of production is updated with the date and time at which the product is produced.

After the process of S143, the processing condition information management portion 25a updates the pre-processing machine processing condition information 24f, the printer processing condition information 24g, the steaming machine processing condition information 24h, and the washing machine processing condition information 24i based on the production history information 24j updated in S143 (S144).

Here, various algorithms can be adopted as the update algorithm in S144.

At the time point the process of S144 is completed, the controller 25 terminates the operation shown in FIG. 9 to FIG. 11.

As described above, in the production management system 20, the recommended condition of processing by the electronic device scheduled to be used for generating a product is determined on the basis of the quality of the product, the type and installing place of the electronic device to use for generation of a product, the processing condition information indicating the relationship with the recommended condition of processing by the electronic device, the target quality of the product, and the type and installing place of the electronic device scheduled to be used for generating a product (S104, S114, S124, S134).

Therefore, the variation in the quality of the product due to the installing place of the electronic device used to generate the product can be reduced.

Since the production management system 20 automatically determines the electronic device scheduled to be used for generating the product based on a specific algorithm (S101, S111, S121, S131), convenience can be improved.

Since the production management system 20 learns the processing condition information based on the actual condition of processing by the electronic device and the actual quality of the product processed by the electronic device under such condition (S141 to S144), the accuracy of the processing condition information can be improved, and as a result, the variation in the quality of the product due to the installing place of the electronic device used to generate the product can be further reduced.

In the present embodiment, the production system 10 produces a product by performing application of the pre-processing agent to the medium, steaming of the medium, and washing of the medium other than printing on the medium with ink. However, the production system 10 may produce the product without executing at least one of the application of the pre-processing agent to the medium, the steaming of the medium, and the washing of the medium.

Second Embodiment

Next, a case where a product is produced by processes performed according to the required amount acquisition program 24k will be described.

Figure 12:
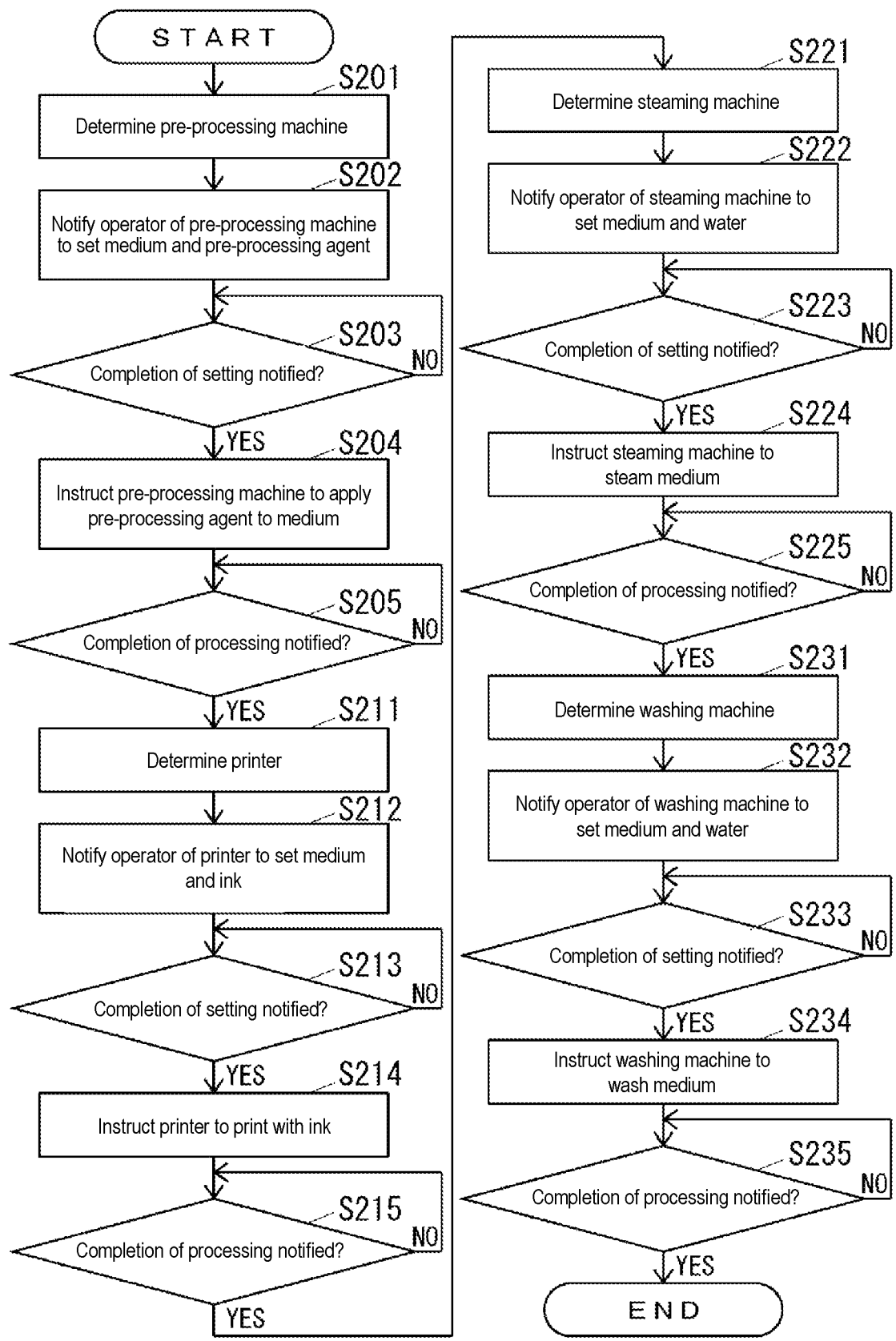
FIG. 12 is a flowchart of an operation of the production management system illustrated in FIG. 2 when producing a product.

FIG. 12 is a flowchart of an operation of the production management system 20 when producing a product.

When receiving a job (hereinafter, referred to as "target job") instructing production of a product via the communication portion 23, the controller 25 performs the processes illustrated in FIG. 12.

The used device determination portion 25b determines a pre-processing machine that applies a pre-processing agent to the medium (S201).

Here, when the pre-processing machine is instructed in the target job, the used device determination portion 25b may determine the pre-processing machine instructed in the target job as a pre-processing machine that applies the pre-processing agent to the medium.

In addition, when receiving an instruction designating a pre-processing machine via the communication portion 23 after receiving the target job, the used device determination portion 25b may determine the designated pre-processing machine as a pre-processing machine that applies the pre-processing agent to the medium.

In addition, the used device determination portion 25b may determine a pre-processing machine automatically selected based on a specific algorithm from among the pre-processing machines registered in the pre-processing machine information 24b as a pre-processing machine that applies a pre-processing agent to the medium.

Here, for example, an arbitrary algorithm such as an algorithm for selecting a pre-processing machine having the smallest number of jobs waiting to be executed or an algorithm for selecting a pre-processing machine having a specific function or performance such as production capacity can be selected as the specific algorithm.

When the pre-processing machine that applies the pre-processing agent to the medium is determined, the controller 25 notifies the operator of the determined processing machine of an instruction to request setting of the medium and the pre-processing agent in the determined pre-processing machine (S202).

In this instruction, the length of the medium to be set in the pre-processing machine and the amount of the pre-processing agent are designated.

The instruction to the operator may be notified to the display portion (not illustrated) of the pre-processing machine determined in S201. Further, the display portion may be a display portion of an electronic device (e.g., the information terminal held by the operator) different from the pre-processing machine.

Thus, upon receiving the notification in S202, the operator of the pre-processing machine sets the designated medium and the pre-processing agent in the designated pre-processing machine.

At this time, a medium having a designated length or more and a pre-processing agent of a designated amount or more are set in the pre-processing machine.

In the present embodiment, when the setting of the designated medium and the pre-processing agent in the designated pre-processing machine is completed, the operator notifies the production management system 20 via an operation portion (not illustrated) of the pre-processing machine or an electronic device different from the pre-processing machine.

When notified that the setting of the medium and the pre-processing agent is completed (S203, YES) after the notification of S202, the controller 25 instructs the pre-processing machine determined in S201 to apply the pre-processing agent to the medium (S204).

Here, the instruction in S204 includes the length of the medium notified in S202, the amount of pre-processing agent notified in S202, and the condition of processing by the pre-processing machine.

Upon receiving the instruction in S204, the pre-processing machine applies the pre-processing agent to the medium according to the instruction in S204, and when the application of the pre-processing agent to the medium is completed, notifies the production management system 20 that the process of applying the pre-processing agent to the medium is completed.

When the controller 25 is notified that the process of applying the pre-processing agent to the medium is completed (S205, YES) after the instruction of S204, the used device determination portion 25b determines a printer to perform printing on the medium with ink (S211).

Here, when the printer is instructed in the target job, the used device determination portion 25b may determine the printer instructed in the target job as the printer to perform printing.

Further, when receiving a new instruction via the communication portion 23 after receiving the target job and when a printer is designated in the newly received instruction, the used device determination portion 25b may determine the printer designated in the newly received instruction as the printer to perform printing.

The used device determination portion 25b may determine a printer automatically selected based on a specific algorithm among the plurality of printers registered in the printer information 24c as the printer to perform printing.

Here, for example, an arbitrary algorithm such as an algorithm for selecting a printer having the smallest number of jobs waiting to be executed or an algorithm for selecting a printer having a specific function or performance such as production capacity can be selected as the specific algorithm.

When the printer to perform printing is determined, the controller 25 notifies an operator of the determined printer of an instruction to request setting of the medium and the ink in the determined printer (S212).

In this instruction, the length of the medium to be set in the pre-processing machine and the amount of ink are designated.

The instruction to the operator may be notified to the display portion (not illustrated) of the printer determined in S211. Further, the display portion may be a display portion of an electronic device (e.g., the information terminal held by the operator) different from the printer.

Thus, upon receiving the notification in S212, the operator of the printer sets the designated medium and ink in the designated printer.

At this time, a medium having a designated length or more and a pre-processing agent of a designated amount or more are set in the printer.

In the present embodiment, when the setting of the designated medium and ink in the designated printer is completed, the operator notifies the production management system 20 via an operation portion (not illustrated) of the printer or an electronic device different from the printer.

When notified that the setting of the medium and the ink is completed (S213, YES) after the process of S212, the controller 25 instructs the printer determined in S211 to perform printing on the medium (S214).

Here, the instruction in S214 includes the length of the medium notified in S212, the amount of ink notified in S212, and the condition of the printing process in the printer.

As a result, upon receiving the instruction in S214, the printer performs printing using ink on the medium according to the instruction in S214.

Then, when the printing on the medium is completed, the production management system 20 is notified that the printing on the medium is completed.

When the controller 25 is notified that the printing process on the medium is completed (S215, YES) after the instruction in S214, the used device determination portion 25b determines a steaming machine to perform the steaming process (steaming process) on the medium (S221).

Here, when the steaming machine is instructed in the target job, the used device determination portion 25b may determine the steaming machine instructed in the target job as the steaming machine to perform the steaming process.

Further, when receiving a new instruction via the communication portion 23 after receiving the target job and when a steaming machine is designated in the newly received instruction, the used device determination portion 25b may determine the steaming machine designated in the newly received instruction as the steaming machine to perform the steaming process.

The used device determination portion 25b may determine a steaming machine automatically selected based on a specific algorithm among the plurality of steaming machines registered in the steaming machine information 24d as the steaming machine to perform the steaming process.

Here, for example, an arbitrary algorithm such as an algorithm for selecting a steaming machine having the smallest number of jobs waiting to be executed or an algorithm for selecting a steaming machine having a specific function or performance such as production capacity can be selected as the specific algorithm.

When the steaming machine to perform the steaming process is determined, the controller 25 notifies an operator of the determined steaming machine of an instruction to request setting of the medium and water in the determined steaming machine (S222).

In this instruction, the length of the medium to be set in the pre-processing machine and the amount of ink are designated.

The instruction to the operator may be notified to the display portion (not illustrated) of the steaming machine determined in S221. Further, the display portion may be a display portion of an electronic device (e.g., the information terminal held by the operator) different from the steaming machine.

Thus, upon receiving the notification in S222, the operator of the steaming machine sets the designated medium and water in the designated steaming machine.

At this time, a medium having a designated length or more and water of a designated amount or more are set in the steaming machine.

In the present embodiment, when the setting of the designated medium and water in the designated steaming machine is completed, the operator notifies the production management system 20 via an operation portion (not illustrated) of the steaming machine or an electronic device different from the steaming machine.

When notified that the setting of the medium and water is completed (S223, YES) after the process of S222, the controller 25 instructs the steaming machine determined in S221 to execute the steaming process (steaming process) on the medium (S224).

Here, the instruction in S224 includes the length of the medium notified in S222, the amount of ink notified in S222, and the condition of processing in the steaming machine.

Thus, upon receiving the instruction in S224, the steaming machine performs the steaming process on the medium according to the instruction in S224.

Then, when the steaming process on the medium is completed, the production management system 20 is notified that the steaming process on the medium is completed.

When the controller 25 is notified that the steaming process on the medium is completed (S225, YES) after the instruction in S224, the used device determination portion 25b determines a washing machine to perform washing (washing process) of the medium (S231).

Here, when the washing machine is instructed in the target job, the used device determination portion 25b may determine the washing machine instructed in the target job as the washing machine to perform the washing process.

Further, when receiving a new instruction via the communication portion 23 after receiving the target job and when a washing machine is designated in the newly received instruction, the used device determination portion 25b may determine the washing machine designated in the newly received instruction as the washing machine to perform the washing process.

Further, the used device determination portion 25b may determine a washing machine automatically selected based on a specific algorithm among a plurality of washing machines registered in the washing machine information 24e as the washing machine to perform the washing process.

Here, for example, an arbitrary algorithm such as an algorithm for selecting a washing machine having the smallest number of jobs waiting to be executed or an algorithm for selecting a washing machine having a specific function or performance such as production capacity can be selected as the specific algorithm.

When the washing machine to perform the washing process is determined, the controller 25 notifies the operator of the determined washing machine of an instruction to request setting of the medium and water to the determined washing machine (S232).

In this instruction, the length of the medium to be set in the pre-processing machine and the amount of water are designated.

The instruction to the operator may be notified to a display portion (not illustrated) of the washing machine determined in S231. Further, the display portion may be a display portion of an electronic device (e.g., the information terminal held by the operator) different from the washing machine.

Thus, upon receiving the notification in S232, the operator of the washing machine sets the designated medium and water in the designated washing machine.

At this time, a medium having a designated length or more and water of a designated amount or more are set in the washing machine.

In the present embodiment, when the setting of the designated medium and water in the designated washing machine is completed, the operator notifies the production management system 20 via an operation portion (not illustrated) of the washing machine or an electronic device different from the washing machine.

When notified that the setting of the medium and water is completed (S233, YES) after the instruction of S232, the controller 25 instructs the washing machine determined in S231 to execute the washing process on the medium (S234).

Here, the instruction in S234 includes the length of the medium notified in S232, the amount of water notified in S232, and the condition of processing in the washing machine.

Thus, upon receiving the instruction in S234, the washing machine performs the washing process on the medium according to the instruction in S234.

Then, when the washing process on the medium is completed, the production management system 20 is notified that the washing process on the medium is completed.

When the controller 25 is notified that the washing process on the medium is completed (S235, YES) after the process of S234, the controller 25 terminates the process.

Next, the operation of the production management system 20 when determining the length of the medium and the amount of processing liquid will be described.

Figure 13:
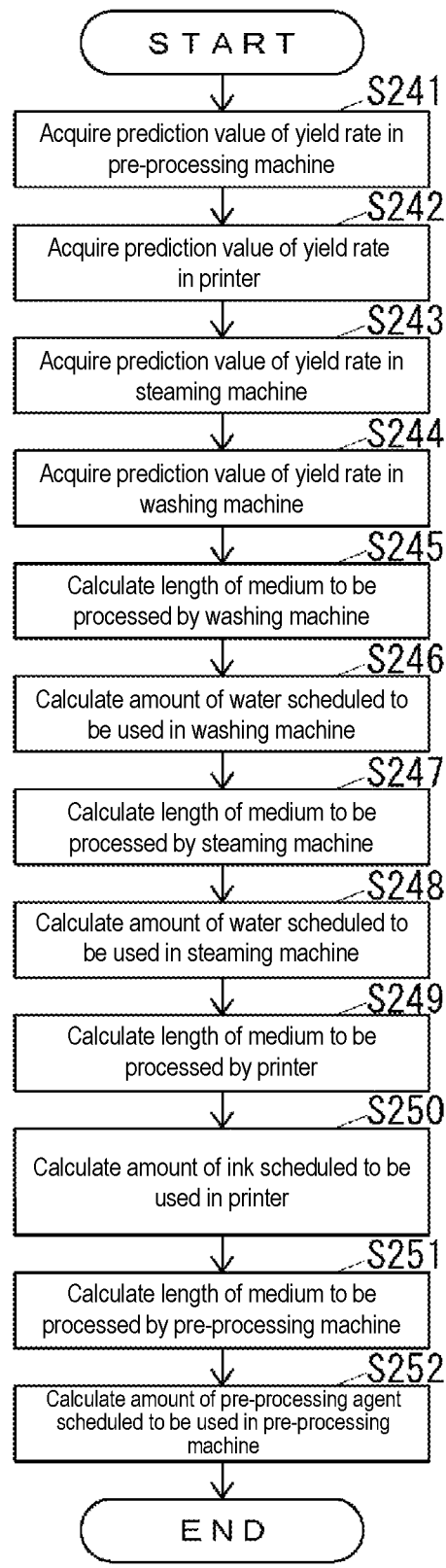
FIG. 13 is a flowchart of an operation of the production management system illustrated in FIG. 2 when determining the length of the medium and the amount of processing liquid.

FIG. 13 is a flowchart of an operation of the production management system 20 when determining the length of the medium and the amount of processing liquid.

When receiving the target job via the communication portion 23, the controller 25 performs the processing illustrated in FIG. 13.

As illustrated in FIG. 13, the yield rate management portion 25d refers to the pre-processing machine yield rate prediction value information 24l to acquire the prediction value of the yield rate in the pre-processing machine (S241).

Here, in the pre-processing machine yield rate prediction value information 24l, the yield rate prediction value is defined for each combination of the identification information of the pre-processing machine, the identification information of the operator of the pre-processing machine, the information indicating the type of medium to be processed by the pre-processing machine, the information indicating the type of pre-processing agent to be used by the pre-processing machine, and the information indicating the condition of processing by the pre-processing machine.

The yield rate management portion 25d refers to the pre-processing machine yield rate prediction value information 24l on the basis of the pre-processing machine, the type of medium, the pre-processing agent, the information on the pre-processing agent, and the information on the operator of the pre-processing machine, and acquires the prediction value of the yield rate in the pre-processing by the pre-processing machine.

Here, the pre-processing machine used to perform the target job is the pre-processing machine determined in S201 described above.

The operator of the pre-processing machine may be instructed in the target job, or may be instructed via the communication portion 23 after receiving the target job.

The type of medium to be processed by the pre-processing machine, the type of pre-processing agent to be used, and the condition of processing by the pre-processing machine are instructed in the target job.

The yield rate management portion 25d refers to the printer yield rate prediction value information 24m to acquire the prediction value of the yield rate in the printer (S242).

Here, in the printer yield rate prediction value information 24m, the yield rate prediction value is defined for each combination of the identification information of the printer, the identification information of an operator of the printer, the information indicating the type of medium to be processed by the printer, the information indicating the type of ink to be used by the printer, and the information indicating a condition of processing by the printer.

The yield rate management portion 25d refers to the printer yield rate prediction value information 24m on the basis of the identification information of the printer, the identification information of the operator of the printer, the information indicating the type of medium to be processed by the printer, and the information indicating the type of ink to be used by the printer to acquire the prediction value of the yield rate in the printing process by the printer.

Here, the printer used for the printing process is the printer determined in S211 described above.

The operator of the printer may be instructed in the target job, or may be instructed via the communication portion 23 after receiving the target job.

The type of medium to be processed by the printer, the type of ink to be used, and the condition of processing by the pre-processing machine are instructed in the target job.

The yield rate management portion 25d refers to the steaming machine yield rate prediction value information 24n to acquire the prediction value of the yield rate in the steaming machine (S243).

Here, in the steaming machine yield rate prediction value information 24n, the yield rate prediction value is defined for each combination of the identification information of the steaming machine, the identification information of the operator of the steaming machine, the information indicating the type of medium to be processed by the steaming machine, the information indicating the type of water to be used by the steaming machine, and the information indicating the condition of processing by the steaming machine.

The yield rate management portion 25d refers to the steaming machine yield rate prediction value information 24n on the basis of the identification information of the steaming machine, the identification information of the operator of the steaming machine, the information indicating the type of medium to be processed by the steaming machine, and the information indicating the type of water to be used by the steaming machine to acquire the prediction value of the yield rate in the steaming process by the steaming machine.

Here, the steaming machine used in the steaming process is the steaming machine determined in S221 described above.

The operator of the steaming machine may be instructed in the target job, or may be instructed via the communication portion 23 after receiving the target job.

The type of medium to be processed by the steaming machine, the type of water to be used, and the condition of processing by the steaming machine are instructed in the target job.

The yield rate management portion 25d refers to the washing machine yield rate prediction value information 24o to acquire the prediction value of the yield rate in the washing process by the washing machine (S244).

Here, in the washing machine yield rate prediction value information 24o, the yield rate prediction value is defined for each combination of the identification information of the washing machine, the identification information of the operator of the washing machine, the information indicating the type of medium to be processed by the washing machine, the information indicating the type of water to be used by the washing machine, and the information indicating the condition of processing by the washing machine.

The yield rate management portion 25d refers to the washing machine yield rate prediction value information

24o on the basis of the identification information of the washing machine, the identification information of the operator of the washing machine, the information indicating the type of medium to be processed by the washing machine, and the information indicating the type of water to be to be used by the washing machine to acquire the prediction value of the yield rate in the washing process by the washing machine.

When the yield rate prediction value in each processing is acquired (S241 to S244), the required amount acquisition portion 25e calculates the length of the medium required for the processing in the washing machine based on the ultimately required length of the product and the prediction value of the yield rate of the medium in the washing machine (S245).

Here, the ultimately required length of the product is designated in the target job. The prediction value of the yield rate of the medium in the washing machine is the value acquired in S244 described above.

For example, when the ultimately required length of the product is 100 m and the prediction value of the yield rate in the washing machine is 95%, the required amount acquisition portion 25e calculates 105.3 m (=100/0.95) as the length of the medium required for the processing in the target job.

Thus, the calculated length (105.3 m) of the medium required for the processing in the target job is included in the instruction to the washing machine in S232 described above.

Subsequently, the required amount acquisition portion 25e calculates the total amount of water required when the washing process is performed by the washing machine based on the calculated length of the medium required for the processing in the target job and the amount of water required when the washing process is performed by the washing machine, which is the required amount per unit length of the medium (S246).

Thus, the calculated total amount of water is included in the instruction to the washing machine in S232 described above. Accordingly, it is instructed to set the calculated total amount of water in the washing machine.

The required amount acquisition portion 25e calculates the length of the medium required for the processing in the steaming machine based on the length of the medium required for the processing in the washing machine and the prediction value of the yield rate of the medium in the steaming machine (S247).

The length of the medium required for the processing in the washing machine is the length calculated in S245 described above. The prediction value of the yield rate of the medium in the steaming machine is the value acquired in S243 described above.

For example, when the length of the medium required for the processing in the washing machine is 105.3 m and the prediction value of the yield rate in the steaming machine is 85%, The required amount acquisition portion 25e calculates 123.9 m (=105.3/0.85) as the length of the medium required for the processing in the steaming machine.

Thus, the length (123.9 m) of the medium required for the processing in the steaming machine is included in the instruction to the steaming machine in S222 described above.

Subsequently, the required amount acquisition portion 25e calculates the total amount of water required when the steaming process is performed by the steaming machine based on the length of the medium required for the processing in the steaming machine and the amount of water required when the steaming process is performed by the steaming machine, which is the required amount per unit length of the medium (S248).

Thus, the calculated total amount of water is included in the instruction to the steaming machine in S222 described above. Accordingly, it is instructed to set the calculated total amount of water in the steaming machine.

The required amount acquisition portion 25e calculates the length of the medium required for the printing process in the printer based on the length of the medium required for the processing in the steaming machine and the prediction value of the yield rate of the medium in the printer (S247).

The length of the medium required for the processing in the steaming machine is the length calculated in S247 described above. The prediction value of the yield rate of the medium in the printer is the value acquired in S242 described above.

For example, when the length of the medium required for the processing in the steaming machine is 123.9 m and the prediction value of the yield rate in the printer is 90%, The required amount acquisition portion 25e calculates 137.7 m (=123.9/0.90) as the length of the medium required for the processing in the printer.

Thus, the length (137.7 m) of the medium required for the processing in the printer is included in the instruction to the printer in S112 described above.

Subsequently, the required amount acquisition portion 25e calculates the total amount of ink required when the printing process is performed by the printer based on the length of the medium required for the printing process in the printer and the amount of ink required when the printing process is performed by the printer, which is the required amount per unit length of the medium (S250).

Thus, the calculated total amount of ink is included in the instruction to the printer in S212 described above. Accordingly, it is instructed to set the calculated total amount of ink in the printer.

The required amount acquisition portion 25e calculates the length of the medium required for the processing in the pre-processing machine based on the length of the medium required for the printing process in the printer and the prediction value of the yield rate of the medium in the pre-processing machine (S251).

The length of the medium required for the processing in the printer is the length calculated in S249 described above. The prediction value of the yield rate of the medium in the pre-processing machine is the value acquired in S241 described above.

For example, when the length of the medium required for the processing in the printer is 137.7 m and the prediction value of the yield rate in the pre-processing machine is 95%, The required amount acquisition portion 25e calculates 144.9 m (=137.7/0.95) as the length of the medium required for the processing in the pre-processing machine.

Thus, the length (144.9 m) of the medium required for the processing in the pre-processing machine is included in the instruction to the pre-processing machine in S102 described above.

Subsequently, the required amount acquisition portion 25e calculates the total amount of pre-processing agent required when the processing is performed by the pre-processing machine based on the length of the medium required for the processing in the pre-processing machine and the amount of pre-processing agent required when the processing is performed by the pre-processing machine, which is the required amount per unit length of the medium (S252).

Thus, the calculated total amount of pre-processing agent is included in the instruction to the pre-processing machine in S202 described above. Accordingly, it is instructed to set the calculated total amount of pre-processing agent in the pre-processing machine.

After the process of S252, the controller 25 terminates the operation illustrated in FIG. 13.

Next, an operation of the production management system 20 when determining the pre-processing machine yield rate prediction value information 24*l* will be described.

Figure 14:
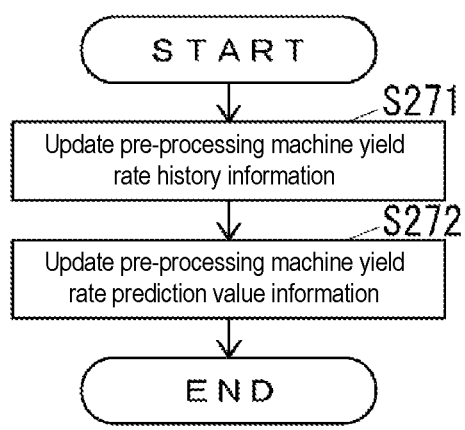
FIG. 14 is a flowchart of an operation of the production management system illustrated in FIG. 2 when updating the pre-processing machine yield rate prediction value information.

FIG. 14 is a flowchart of an operation of the production management system 20 when updating the pre-processing machine yield rate prediction value information 24*l*.

When determining in S205 that the completion of the process of applying the pre-processing agent to the medium has been notified, the controller 25 performs the operation illustrated in FIG. 14.

As illustrated in FIG. 14, the yield rate management portion 25*d* updates the pre-processing machine yield rate history information 24*p* regarding the processing of which completion has been notified (S271).

Here, in the pre-processing machine yield rate history information 24*p*, the yield rate may be input by a human such as an operator of the pre-processing machine or may be automatically acquired by a sensor (not illustrated) of the pre-processing machine.

After the process of S271, the yield rate management portion 25*d* updates the pre-processing machine yield rate prediction value information 24*l* based on the pre-processing machine yield rate history information 24*p* updated in S271 (S172).

Here, various algorithms can be adopted as the update algorithm in S272.

Here, in the pre-processing machine yield rate history information 24*p*, the yield rate prediction value is defined for each combination of the identification information of the pre-processing machine, the identification information of the operator of the pre-processing machine, the information indicating the type of medium to be processed by the pre-processing machine, the information indicating the type of pre-processing agent to be used by the pre-processing machine, and the information indicating the condition of processing by the pre-processing machine.

Therefore, the yield rate prediction value of each combination may be an average value of the yield rates obtained at the time of processing in each combination.

After the process of S172, the controller 25 terminates the operation illustrated in FIG. 14.

Here, the update of the pre-processing machine yield rate prediction value information 24*l* has been described.

However, the same applies to the update of the printer yield rate prediction value information 24*m*, the update of the steaming machine yield rate prediction value information 24*n*, and the update of the washing machine yield rate prediction value information 24*o*.

That is, when determining in S215 that the completion of the printing process on the medium with ink has been notified, the yield rate management portion 25*d* updates the printer yield rate history information 24*q* regarding the processing of which completion has been notified, and updates the printer yield rate prediction value information 24*m* based on the updated printer yield rate history information 24*q*.

Further, when determining in S225 that the completion of the steaming process on the medium has been notified, the yield rate management portion 25*d* updates the steaming machine yield rate history information 24*r* regarding the processing of which completion has been notified, and updates the steaming machine yield rate prediction value information 24*n* based on the updated steaming machine yield rate history information 24*r*.

Further, when determining in S235 that the completion of the washing process on the medium has been notified, the yield rate management portion 25*d* updates the washing machine yield rate history information 24*s* regarding the processing of which completion has been notified, and updates the washing machine yield rate prediction value information 24*o* based on the updated washing machine yield rate history information 24*s*.

Next, an operation of the production management system 20 when a medium is registered will be described.

After designating the identification information, the length, and the state of the medium desired to be registered in the production management system 20, the user can instruct the production management system 20 to register the medium via an electronic device (not illustrated).

When registration of the medium is instructed via the communication portion 23, the medium management portion 25*f* registers the media instructed to be registered in the medium management information 24*t*.

Next, an operation of the production management system 20 when updating the medium management information 24*t* in a case where the process of applying the pre-processing agent to the medium is completed will be described.

Figure 15:
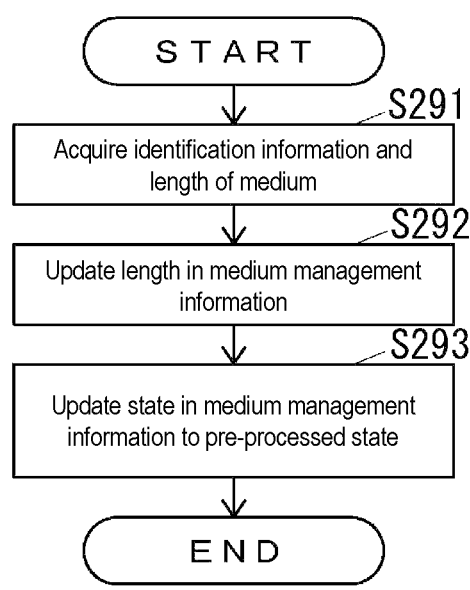
FIG. 15 is a flowchart of an operation of the production management system illustrated in FIG. 2 when updating the medium management information in a case where the process of applying the pre-processing agent to the medium is completed.

FIG. 15 is a flowchart of an operation of the production management system 20 when updating the medium management information 24*t* in a case where the process of applying the pre-processing agent to the medium is completed.

When determining in S205 that the completion of the process of applying the pre-processing agent to the medium has been notified, the controller 25 performs the operation illustrated in FIG. 15.

As illustrated in FIG. 15, the medium management portion 25*f* acquires the identification information of the medium used in the processing of which completion has been notified and the current length of the medium from the pre-processing machine that has notified that the process of applying the pre-processing agent to the medium has been completed (S291).

Here, the pre-processing machine may automatically acquire the identification information of the medium from the medium by a sensor (not illustrated), or may be input by a human such as an operator of the pre-processing machine. Further, the pre-processing machine may automatically acquire the current length of the medium from the medium by a sensor (not illustrated), or may be input by a human such as an operator of the pre-processing machine.

After the process of S291, the medium management portion 25*f* updates the length associated in the medium management information 24*t* with the identification information of the medium acquired in S291 to the length acquired in S291 (S292).

Next, after the process of S292, the medium management portion 25*f* updates the state of the medium associated with the identification information of the medium acquired in S291 to the "pre-processed state" in the medium management information 24*t* (S293).

As an example, in FIG. 8, the state of the medium corresponding to the identification information "MED001" is changed from the "unprocessed state" to the "pre-processed state".

Then, the operation illustrated in FIG. 15 is terminated.

Here, the update of the medium management information 24*t* when the process of applying the pre-processing agent to the medium is completed has been described.

However, the same applies to the update of the medium management information 24*t* when the printing on the medium is completed, the update of the medium management information 24*t* when the steaming process of the medium is completed, and the update of the medium management information 24*t* when the washing process of the medium is completed.

That is, when notified that the printing on the medium is completed (S215, YES), the medium management portion 25*f* acquires the identification information of the medium on which the printing is completed and the information indicating the current length of the medium on which the printing is completed from the printer that has notified the completion of the printing (S291).

Then, the medium management portion 25*f* changes the content of the information indicating the length of the medium associated with the identification number of the medium on which the printing is completed to the length acquired in S291 in the medium management information 24*t* (S292).

Furthermore, the medium management portion 25*f* changes the information indicating the state of the medium associated with the identification number of the medium on which the printing is completed to the "printed state" in the medium management information 24*t*.

Further, when notified that the steaming process on the medium is completed (S225, YES), the medium management portion 25*f* acquires the identification information of the medium on which the steaming process is completed and the information indicating the current length of the medium on which the steaming process is completed from the steaming machine that has notified the completion of the steaming process (S291).

Then, the medium management portion 25*f* changes the content of the information indicating the length of the medium associated with the identification number of the medium on which the steaming process is completed to the length acquired in S291 in the medium management information 24*t* (S292).

Furthermore, the medium management portion 25*f* changes the information indicating the state of the medium associated with the identification number of the medium on which the steaming process is completed to the "steaming processed state" in the medium management information 24*t*.

Further, when notified that the washing process on the medium is completed (S235, YES), the medium management portion 25*f* acquires the identification information of the medium on which the washing process is completed and the information indicating the current length of the medium on which the washing process is completed from the washing machine that has notified the completion of the washing process (S291).

Then, the medium management portion 25*f* changes the content of the information indicating the length of the medium associated with the identification number of the medium on which the washing process is completed to the length acquired in S291 in the medium management information 24*t* (S292).

Furthermore, the medium management portion 25*f* changes the information indicating the state of the medium associated with the identification number of the medium on which the washing process is completed to the "washing processed state" in the medium management information 24*t*.

In the pre-processing machine, the medium management information 24*t* and the necessary information regarding the execution of processing are displayed on a display portion (not illustrated) of the pre-processing machine or a display portion of an electronic device (e.g., the information terminal held by the operator) different from the pre-processing machine.

When setting the medium in the pre-processing machine, the operator of the pre-processing machine can set the medium having a length and a state suitable for being set in the pre-processing machine in the pre-processing machine by checking the information displayed on the display portion.

Here, the case of the pre-processing machine has been described, but the medium management information 24*t* and the necessary information regarding the processing may be displayed on the display portion for the operator of the printer, the operator of the steaming machine, and the operator of the washing machine.

Thus, when setting the medium in the printer, the operator of the printer can set the medium having a length and a state suitable for being set in the printer in the printer by checking the information displayed on the display portion.

When setting the medium in the printer, the operator of the steaming machine can set the medium having a length and a state suitable for being set in the steaming machine in the steaming machine by checking the information displayed on the display portion.

When setting the medium in the printer, the operator of the washing machine can set the medium having a length and a state suitable for being set in the washing machine in the washing machine by checking the information displayed on the display portion.

As described above, since the production management system 20 acquires the required amount of media on the basis of the required amount of products and the prediction value of the yield rate of the medium in each step of generating the product (S245, S247, S249, and S251), a more appropriate amount of products than the conventional art can be produced.

Since the production management system 20 acquires the amount of substance used in the step based on the amount of media required for each step of generating the product (S246, S248, S250, and S252), a more appropriate amount of products can be produced.

Since the production management system 20 generates the prediction value of the yield rate in the step based on the actual yield rate in each step of generating a product (S272), the accuracy of the prediction value of the yield rate can be improved.

As described above, in the pre-processing machine yield rate prediction value information 24*l*, the yield rate prediction value is defined for each combination of the identification information of the pre-processing machine, the identification information of the operator of the pre-processing machine, the information indicating the type of medium to be processed by the pre-processing machine, the information indicating the type of pre-processing agent to be used by the pre-processing machine, and the information indicating the condition of processing by the pre-processing machine.

In the printer yield rate prediction value information 24*m*, the yield rate prediction value is defined for each combination of the identification information of the printer, the identification information of an operator of the printer, the information indicating the type of medium to be processed by the printer, the information indicating the type of ink to be used by the printer, and the information indicating a condition of processing by the printer.

In the steaming machine yield rate prediction value information $24n$, the yield rate prediction value is defined for each combination of the identification information of the steaming machine, the identification information of the operator of the steaming machine, the information indicating the type of medium to be processed by the steaming machine, the information indicating the type of water to be used by the steaming machine, and the information indicating the condition of processing by the steaming machine.

In the washing machine yield rate prediction value information $24o$, the yield rate prediction value is defined for each combination of the identification information of the washing machine, the identification information of the operator of the washing machine, the information indicating the type of medium to be processed by the washing machine, the information indicating the type of water to be used by the washing machine, and the information indicating the condition of processing by the washing machine.

Therefore, in the production management system 20, a prediction value (prediction value of the yield rate) in which the actual yield rate in the processing in each step is determined is defined for each combination of the identification information of the electronic device that performs each step of generating the product, the identification information of the operator of the electronic device, the type of medium to be processed by the electronic device, the type of liquid (pre-processing agent, ink, water) to be used by the electronic device, and the condition of processing by the electronic device.

Thus, the required amount of media can be acquired on the basis of the prediction value, so that a more appropriate amount of products can be produced.

For example, when the electronic device is a washing machine, the required amount of media is obtained based on the prediction value acquired in S245 (S246).

In the case of the steaming machine, the required amount of media is obtained based on the prediction value acquired in S243 (S247).

In the case of the printer, the required amount of media is obtained based on the prediction value acquired in S242 (S249).

In the case of the pre-processing machine, the required amount of media is obtained based on the prediction value acquired in S241 (S251).

Since the production management system 20 manages the amount of media for each medium (S292), a product can be generated using a medium of a required amount, and as a result, a more appropriate amount of products can be produced.

The production management system 20 calculates the amount of the pre-processing agent other than the length of the medium as the amount of substance to be used in the pre-processing machine. However, the production management system 20 may calculate the amount of substances other than the pre-processing agent instead of the amount of the pre-processing agent or in addition to the amount of the pre-processing agent as the amount of substance to be used in the pre-processing machine. Although the amount of substance to be used in the pre-processing machine has been described above, the same applies to the amount of substance to be used in the printer, the amount of substance to be used in the steaming machine, and the amount of substance to be used in the washing machine.

In the present embodiment, in the pre-processing machine yield rate prediction value information $24l$, the yield rate prediction value is defined for each combination of the identification information of the pre-processing machine, the identification information of the operator of the pre-processing machine, the information indicating the type of medium to be processed by the pre-processing machine, the information indicating the type of pre-processing agent to be used by the pre-processing machine, and the information indicating the condition of processing by the pre-processing machine.

However, the prediction value of the yield rate of the medium in the pre-processing machine may not be a different value for each combination of the identification information of the pre-processing machine, the identification information of the operator of the pre-processing machine, the information indicating the type of medium to be processed by the pre-processing machine, the information indicating the type of pre-processing agent to be used by the pre-processing machine, and the information indicating the condition of processing by the pre-processing machine.

Here, the prediction value of the yield rate of the medium in the pre-processing machine has been described, but the same applies to the prediction value of the yield rate of the medium in the printer, the prediction value of the yield rate of the medium in the steaming machine, and the prediction value of the yield rate of the medium in the washing machine.

In the present embodiment, the production system 10 produces a product by performing application of the pre-processing agent to the medium, steaming (steaming) of the medium, and washing of the medium other than printing on the medium with ink.

However, the production system 10 may produce the product without executing at least one of the application of the pre-processing agent to the medium, the steaming of the medium, and the washing of the medium.

The invention claimed is:

1. A production management system that manages production of a product generated by executing a printing process on a medium, wherein
  a step of generating the product includes:
    a printing step, and
    at least one of a pre-processing step of the printing process and a post-processing step of the printing process;
  wherein the production management system comprises a processor configured to:
    manage a processing condition information indicating a recommended condition of processing by an electronic device that perform at least one step of generating the product; and
    determine a recommended condition of processing by the electronic device scheduled to be used for generation of the product;
  wherein the processing condition information is information indicating, for every step of generating the product, a relationship among:
    a quality of the product,
    a type and an installing place of the electronic device, and
    a recommended condition of processing by the electronic device;
  wherein the processor is configured to determine a recommended condition of processing by the electronic device scheduled to be used for generation of the product based on:

a target quality of the product,
a type and an installing place of the electronic device scheduled to be used for generation of the product, and
the processing condition information managed by the processor;
wherein the electronic device comprises:
- a pre-processing machine that performs the pre-processing of the printing process on the medium, and the recommended condition of processing includes a temperature in a vicinity of a region where the pre-processing is performed in the medium;
- a steaming machine that performs a steaming process on the medium that is printed, and the recommended condition of processing includes a temperature and a humidity in a vicinity of a region where the steaming process is performed in the medium;
- a washing machine that performs a washing process which is the post-processing on the medium that is printed, and the recommended condition of processing includes a temperature in a vicinity of a region where the washing process is performed in the medium.

2. The production management system as set forth in claim 1,
wherein the processor is configured to automatically determine the electronic device scheduled to be used for generation of the product based on a specific algorithm.

3. The production management system as set forth in claim 1, wherein
the processor is configured to learn the processing condition information based on an actual condition of processing by the electronic device and an actual quality of the product processed by the electronic device under the actual condition.

4. A non-transitory computer readable medium stored with production management program that manages production of a product generated by executing a printing process on a medium, wherein
a step of generating the product includes:
a printing step, and
at least one of a pre-processing step of the printing process and a post-processing step of the printing process;
wherein the production management program causes a computer to realize:
a processing condition information management portion that manages a processing condition information indicating a recommended condition of processing by an electronic device that performs at least one step of generating the product; and
a recommended condition determination portion that determines a recommended condition of processing by the electronic device scheduled to be used for generation of the product;
wherein the processing condition information is information indicating, for every step of generating the product, a relation among:
a quality of the product,
a type and an installing place of the electronic device, and
a recommended condition of processing by the electronic device;
wherein the recommended condition determination portion determines a recommended condition of processing by the electronic device scheduled to be used for generation of the product based on:
a target quality of the product,
a type and an installing place of the electronic device scheduled to be used for generation of the product, and
the processing condition information managed by the processing condition information management portion;
wherein the electronic device comprises:
- a pre-processing machine that performs the pre-processing of the printing process on the medium, and the recommended condition of processing includes a temperature in a vicinity of a region where the pre-processing is performed in the medium;
- a steaming machine that performs a steaming process on the medium that is printed, and the recommended condition of processing includes a temperature and a humidity in a vicinity of a region where the steaming process is performed in the medium;
- a washing machine that performs a washing process which is the post-processing on the medium that is printed, and the recommended condition of processing includes a temperature in a vicinity of a region where the washing process is performed in the medium.

5. A production quantity management system that manages production of a product generated by executing a printing process on a medium, wherein
a step of generating the product includes:
a printing step; and
at least one of a pre-processing step of the printing process and a post-processing step of the printing process,
wherein the production quantity management system comprises a processor configured to:
manage a prediction value of a yield rate of the medium in each step of generating the product; and
acquire an amount of the medium required for each step of generating the product;
wherein the processor is configured to acquire a required amount of the medium based on a required amount of the product and the prediction value managed by the processor;
wherein the processor is configured to manage the prediction value in the step in association with a value of at least one item of identification information of an electronic device that executes at least one step among the steps of generating the product, identification information of an operator of the electronic device, type of medium to be processed by the electronic device, type of substance to be used by the electronic device, and a condition of processing by the electronic device; and
the processor is configured to acquire the required amount of the medium based on the required amount of the product and the prediction value managed by the processor in association with an actual value of the item;
wherein the electronic device comprises:
- a pre-processing machine that performs the pre-processing of the printing process on the medium, and the recommended condition of processing includes a temperature in a vicinity of a region where the pre-processing is performed in the medium;
- a steaming machine that performs a steaming process on the medium that is printed, and the recommended condition of processing includes a temperature and a humidity in a vicinity of a region where the steaming process is performed in the medium;

a washing machine that performs a washing process which is the post-processing on the medium that is printed, and the recommended condition of processing includes a temperature in a vicinity of a region where the washing process is performed in the medium.

6. The production quantity management system as set forth in claim 5, wherein
the processor is configured to acquire an amount of substance used in the step based on the amount of the medium required for at least one of the steps of generating the product.

7. The production quantity management system as set forth in claim 5, wherein
the processor is configured to generate the prediction value in the step based on an actual yield rate in at least one of the steps of generating the product.

8. The production quantity management system as set forth in claim 5,
wherein the processor is configured to manage an amount of the medium for each medium.

9. The production management system as set forth in claim 2, wherein
the processor is configured to learn the processing condition information based on an actual condition of processing by the electronic device and an actual quality of the product processed by the electronic device under the actual condition.

10. The production quantity management system as set forth in claim 6, wherein
the processor is configured to generate the prediction value in the step based on an actual yield rate in at least one of the steps of generating the product.

11. The production quantity management system as set forth in claim 6, wherein
the processor is configured to manage the prediction value in the step in association with a value of at least one item of identification information of an electronic device that executes at least one step among the steps of generating the product, identification information of an operator of the electronic device, type of medium to be processed by the electronic device, type of substance to be used by the electronic device, and a condition of processing by the electronic device; and
the processor is configured to acquire the required amount of the medium based on the required amount of the product and the prediction value managed by the processor in association with an actual value of the item.

12. The production quantity management system as set forth in claim 7, wherein
the processor is configured to manage the prediction value in the step in association with a value of at least one item of identification information of an electronic device that executes at least one step among the steps of generating the product, identification information of an operator of the electronic device, type of medium to be processed by the electronic device, type of substance to be used by the electronic device, and a condition of processing by the electronic device; and
the processor is configured to acquire the required amount of the medium based on the required amount of the product and the prediction value managed by the processor in association with an actual value of the item.

13. The production quantity management system as set forth in claim 6,
wherein the processor is configured to manage an amount of the medium for each medium.

14. The production quantity management system as set forth in claim 7,
wherein the processor is configured to manage an amount of the medium for each medium.

\* \* \* \* \*